(12) United States Patent
Adachi

(10) Patent No.: US 7,589,794 B2
(45) Date of Patent: Sep. 15, 2009

(54) SYSTEM FOR DELIVERING CONTENTS AUTOMATICALLY

(75) Inventor: Hiroaki Adachi, Tokyo (JP)

(73) Assignee: Sony Corporation, Tokyo (JP)

( * ) Notice: Subject to any disclaimer, the term of this patent is extended or adjusted under 35 U.S.C. 154(b) by 788 days.

(21) Appl. No.: 11/334,492

(22) Filed: Jan. 19, 2006

(65) Prior Publication Data

US 2006/0164546 A1 Jul. 27, 2006

(30) Foreign Application Priority Data

Jan. 24, 2005 (JP) ............................ 2005-016117

(51) Int. Cl.
*H04N 5/46* (2006.01)
*H04N 7/01* (2006.01)
*H04N 5/268* (2006.01)

(52) U.S. Cl. ................... 348/555; 348/705; 348/441

(58) Field of Classification Search ......... 348/553–556, 348/705, 706, 441, 449; *H04N 5/46, 5/44, H04N 5/268, 7/01, 11/20*
See application file for complete search history.

(56) References Cited

U.S. PATENT DOCUMENTS 6,965,415 B2 * 11/2005 Lundblad et al. ............ 348/556
7,184,093 B2 * 2/2007 Manning ..................... 348/556
7,450,179 B2 * 11/2008 Higashi et al. .............. 348/555

FOREIGN PATENT DOCUMENTS

| JP | 63-253776 | 10/1988 |
|---|---|---|
| JP | 7-38807 | 2/1995 |
| JP | 2003-304481 | 10/2003 |
| WO | WO 02/054762 A1 | 7/2002 |

* cited by examiner

*Primary Examiner*—Sherrie Hsia
(74) *Attorney, Agent, or Firm*—Oblon, Spivak, McClelland, Maier & Neustadt, P.C.

(57) ABSTRACT

A system for delivering contents automatically has first and second signal-selecting-and-delivering devices each for selecting a contents-signal from the contents-signals each having any of first and second formats of contents-signal and delivering the selected contents-signal having each of the first and second formats. It also has a signal-supplying device that supplies the contents-signals having the first and second formats to the first and second signal-selecting-and-delivering devices, respectively, and a signal-converting device that converts the contents-signal having the first format into the contents-signal having the second format and supplies the converted contents-signal having the second format to the second signal-selecting-and-delivering device. It further has a control device that controls the signal-supplying device and the first and second signal-selecting-and-delivering devices to allow the first and second signal-selecting-and-delivering devices to deliver the contents-signals having each of the first and second formats, based on a predetermined delivery schedule of the contents.

8 Claims, 11 Drawing Sheets

FIG. 2 (RELATED ART)

| CONTENTS SIGNALS | IMAGES OF CONTENTS TO BE DELIVERED | IMAGES BASED ON HD DELIVERY SIGNAL | IMAGES BASED ON SD DELIVERY SIGNAL | | PREFERED IMAGES BASED ON SD DELIVERY SIGBAL |
|---|---|---|---|---|---|
| | | | DOWN-CONVERTER | | |
| | | | LETTER-BOX PROCESSING | SIDES-CUT PROCESSING | |
| 16:9 HD | | | | | |
| 4:3 HD | | | | | |
| 4:3 SD | | | | | |
| 16:9 SD | | | | | |

F I G. 4

| SCHEDULED DELIVERY START TIME | TITLE | STORAGE INFORMATION | SPECIFICATION INFORMATION | START ADDRESS INFORMATION | |
|---|---|---|---|---|---|
| 13:00:00 | PG-1 | VTR-1 | HD-16:9 | 00:05:00:00 | |
| 13:29:00 | CM-1 | BANK-C1 | SD-4:3 | ADDRESS=091000h | |
| 13:29:30 | CM-2 | BANK-C2 | SD-4:3 | ADDRESS=213000h | |
| 13:30:00 | PG-2 | BANK-P1 | SD-16:9 | ADDRESS=570000h | |
| 13:45:00 | PG-3 | VTR-2 | HD-16:9 | 00:30:00:00 | |
| 13:59:45 | CM-2 | BANK-C3 | SD-4:3 | ADDRESS=320000h | |
| 14:00:00 | PG-4 | VTR-3 | HD-4:3 | 01:00:10:00 | |
| 14:45:00 | PG-5 | BANK-P2 | SD-4:3 | ADDRESS=820000h | |
| ---- | | | | ---- | ---- |

F I G. 6
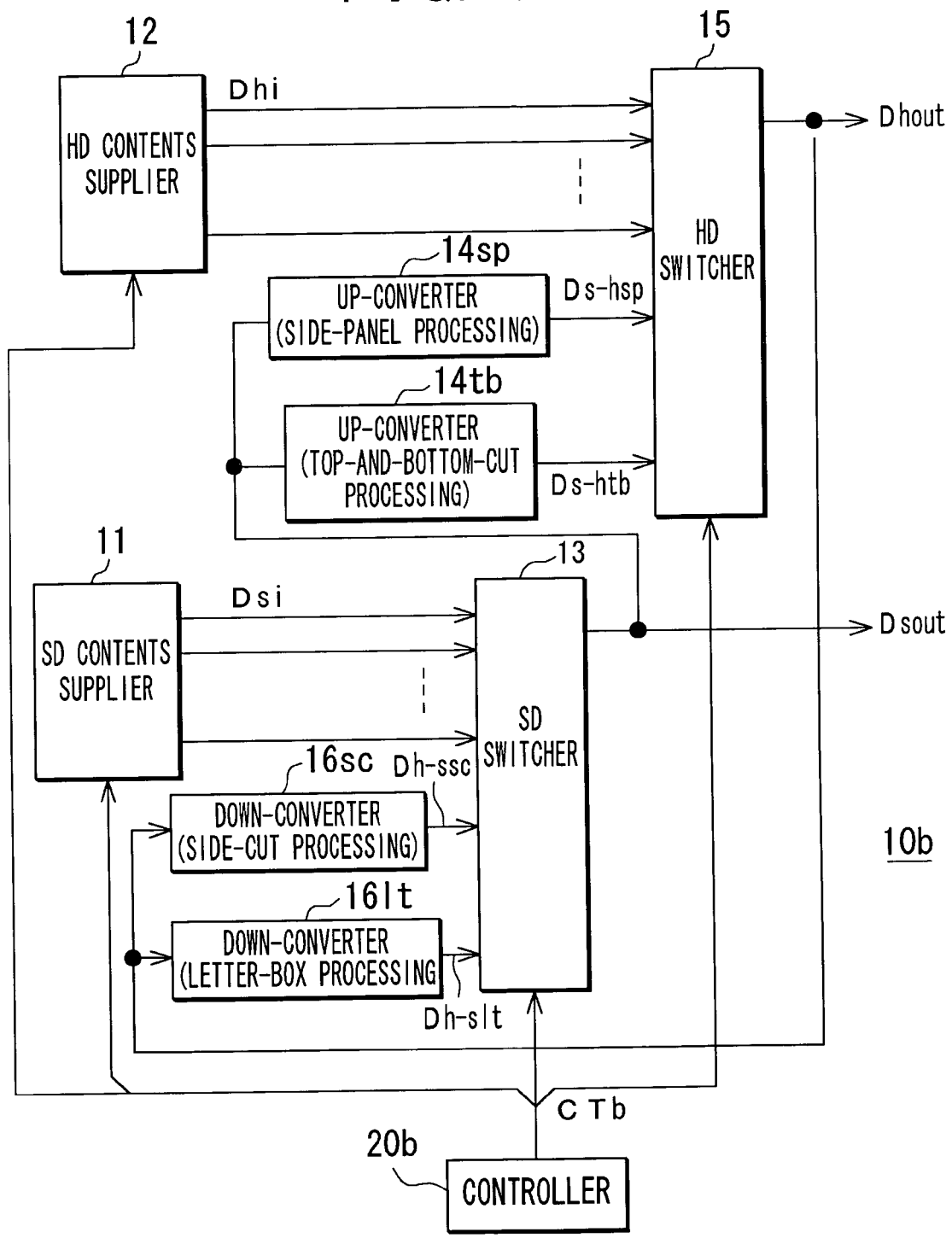

FIG. 7

| CONTENTS SIGNALS | IMAGES OF CONTENTS TO BE DELIVERED | IMAGES BASED ON HD DELIVERY SIGNAL | | IMAGES BASED ON SD DELIVERY SIGNAL | |
|---|---|---|---|---|---|
| | | UP-CONVERTER | | DOWN-CONVERTER | |
| | | SIDE-PANEL PROCESSING | TOP-AND-BOTTOM-CUT PROCESSING | LETTER-BOX PROCESSING | SIDES-CUT PROCESSING |
| 16:9 HD | | | | | |
| 4:3 HD | | | | | |
| 4:3 SD | | | | | |
| 16:9 SD | | | | | |

FIG. 9

| SWITCH OF CONTENTS | SD SWITCHER | | HD SWITCHER | |
|---|---|---|---|---|
| | SUPPLY CONTENTS TO UP-CONVERTER (PORT POsu) | DELIVERY OF CONTENTS (PORT POs) | SUPPLY CONTENTS TO DOWN-CONVERTER (PORT POhd) | DELIVERY OF CONTENTS (PORT POh) |
| HD→HD | — | — | JUST | JUST |
| HD→SD | FAST | JUST | — | JUST |
| SD→HD | — | JUST | FAST | JUST |
| SD→SD | JUST | JUST | — | — |

F I G. 10
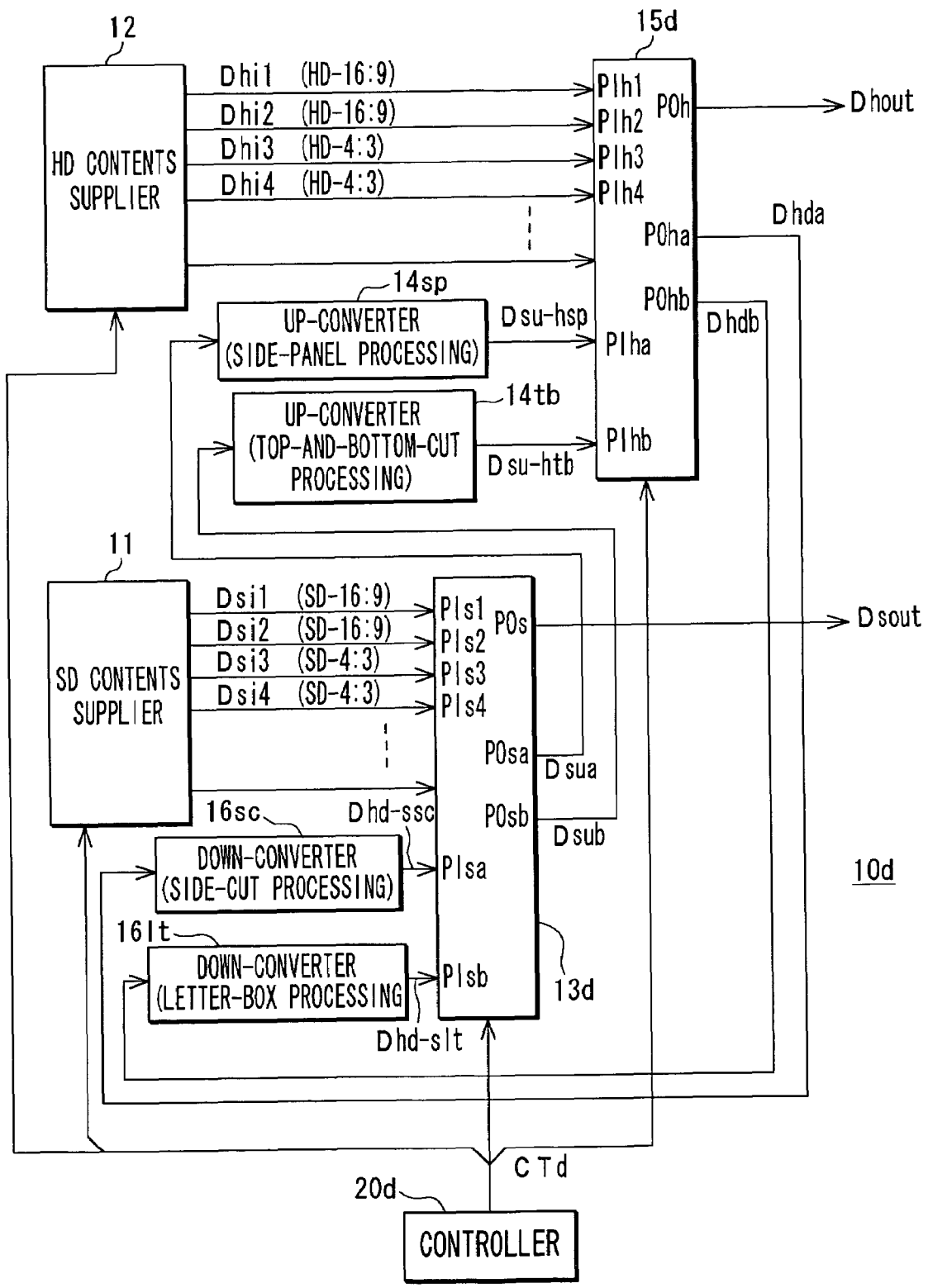

FIG. 11

| | SWITCH OF CONTENTS | SD SWITCHER | | | HD SWITCHER | | |
|---|---|---|---|---|---|---|---|
| | | SUPPLY CONTENTS TO UP-CONVERTER (PORT POsb) TOP-AND-BOTTOM-CUT PROCESSING | SUPPLY CONTENTS TO UP-CONVERTER (PORT POsa) SIDE-PANEL PROCESSING | DELIVERY OF CONTENTS (PORT POs) | SUPPLY CONTENTS TO DOWN-CONVERTER (PORT POha) SIDES-CUT PROCESSING | SUPPLY CONTENTS TO DOWN-CONVERTER (PORT POhb) LETTER-BOX PROCESSING | DELIVERY OF CONTENTS (PORT POh) |
| CASE1 | HD16→HD16 | — | — | CONT (Plsb) | — | JUST (Plh1→Plh2) | JUST (Plh1→Plh2) |
| CASE2 | HD16→HD4 | — | — | JUST (Plsb→Plsa) | FAST (→Plh4) | — | JUST (Plh1→Plh4) |
| CASE3 | HD4→HD16 | — | — | JUST (Plsa→Plsb) | — | — | JUST (Plh3→Plh2) |
| CASE4 | HD4→HD4 | — | — | CONT (Plsa) | — | — | JUST (Plh3→Plh4) |
| CASE5 | HD16→SD16 | — | FAST (→Plsa) | JUST (Plsb→Plsa) | — | — | JUST (Plh1→Plhb) |
| CASE6 | HD16→SD4 | FAST (→Pls2) | — | JUST (Plsb→Pls2) | — | — | JUST (Plh1→Plhb) |
| CASE7 | HD4→SD16 | — | FAST (→Pls4) | JUST (Plsa→Pls4) | — | — | JUST (Plh3→Plhb) |
| CASE8 | HD4→SD4 | FAST (→Pls2) | — | JUST (Plsa→Pls2) | — | — | JUST (Plh3→Plha) |
| CASE9 | SD16→HD16 | — | — | JUST (Pls1→Plsb) | — | FAST (→Plh2) | JUST (Plhb→Plh2) |
| CASE10 | SD16→HD4 | — | — | JUST (Pls1→Plsa) | FAST (→Plh4) | — | JUST (Plhb→Plh4) |
| CASE11 | SD4→HD16 | — | — | JUST (Pls3→Plsb) | — | FAST (→Plh2) | JUST (Plha→Plh2) |
| CASE12 | SD4→HD4 | — | — | JUST (Pls3→Plsa) | FAST (→Plh4) | — | JUST (Plha→Plh4) |
| CASE13 | SD16→SD16 | JUST (Pls1→Pls2) | — | JUST (Pls1→Pls2) | — | — | CONT (Plhb) |
| CASE14 | SD16→SD4 | — | FAST (→Pls4) | JUST (Pls1→Pls4) | — | — | JUST (Plhb→Plha) |
| CASE15 | SD4→SD16 | FAST (→Pls2) | — | JUST (Pls3→Pls2) | — | — | JUST (Plha→Plhb) |
| CASE16 | SD4→SD4 | — | JUST (Pls3→Pls4) | JUST (Pls3→Pls4) | — | — | CONT (Plha) |

SYSTEM FOR DELIVERING CONTENTS AUTOMATICALLY

CROSS REFERENCES TO RELATED APPLICATIONS

The present invention contains subject matters related to Japanese Patent Application JP 2005-16117 filed in the Japanese Patent Office on Jan. 24, 2005, the entire contents of which being incorporated herein by reference.

BACKGROUND OF THE INVENTION

1. Field of the Invention

The invention relates to a system for delivering contents automatically. More particularly, it relates to a system for delivering contents such as broadcast programs from television broadcasting station etc. automatically.

2. Related Art

In the past, a television broadcasting station or a head end of a cable TV has utilized a system for delivering signals on various kinds of contents to be broadcast or to be delivered (hereinafter referred to as "contents-signal(s)" simply) automatically at predetermined time on set channels based on a predetermined schedule (see Japanese Patent Application Publication No. H10-41906). For these contents-signals to be used in the above system are available various kinds of contents-signals such as contents-signals supplied to and stored in a server through a broadcast repeater antenna or a network, contents-signals stored in recording medium like videotape, optical disk, or the like. Such the contents-signals may include signals not only with a standard definition (SD) format but also with a high definition (HD) format, which relates to higher resolution as compared to the signals with the SD format.

If using contents-signals with SD format (hereinafter referred to as "SD contents-signals") Dsi or contents-signals with HD format (hereinafter referred to as "HD contents-signals") Dhi, a related system for delivering contents automatically, which is shown in FIG. 1, converts the SD contents-signals Dsi output from SD contents supplier 51 into HD contents-signals Ds-h by up-converters 53 to supply them to an HD switcher 54. HD contents-signals Dhi output from HD contents supplier 52 are also supplied to the HD switcher 54. The HD switcher 54 selects a signal to be delivered from the HD contents-signals Dhi supplied from HD contents supplier 52 and the HD signals-signals Ds-h supplied from the up-converters 53 and outputs selected one as HD delivery signals Dhout. When simultaneous delivery that the HD contents and the SD contents are simultaneously delivered is performed, the signal selected in the HD switcher 54 is supplied to a down-converter 55 where it is converted into signals having the SD format to be output as SD delivery signal Dsout. Thus, if the SD contents-signals are converted into HD contents-signals to supply the converted ones to the HD switcher 54, the contents can be delivered according to the same operations as those of a case where contents-signals having one format are delivered.

SUMMARY OF THE INVENTION

If, however, the up-converter for converting SD contents-signals into HD contents-signals is provided for every SD contents, the system for delivering the contents automatically is complicated so that it can be expensive. Further, if simultaneous delivery such that the HD contents-signals and the SD contents-signals, which have the same contents, are simultaneously delivered is performed, in order to allow the SD contents-signals Dsi to be delivered, it is necessary not only to convert the SD contents-signals Dsi into the HD contents-signals Ds-h but also to convert the HD contents-signals Ds-h back to the SD contents-signals, so that, if not, the SD delivery signal Dsout is prevented from being output. If such the conversion operations are repeated to produce the SD delivery signal Dsout, an image based on the SD delivery signal Dsout has less image quality than that of a case where the switcher selects and delivers the SD contents-signals Dsi.

For an aspect ratio of image on the contents-signal to be delivered, any lack can occur in the image showing the contents or the image showing the contents can be displayed as to be reduced from its screen. FIG. 2 illustrates relationships between images of contents to be delivered and images based on delivered delivery signals. It is to be noted that, in FIG. 2, is shown a case where any signals such as HD contents-signals of image showing the contents, the aspect ration of which is 16:9 (hereinafter referred to as "16:9 HD contents-signals"), HD contents-signals of image showing the contents, the aspect ration of which is 4:3 (hereinafter referred to as "4:3 HD contents-signals"), SD contents-signals of image showing the contents, the aspect ration of which is 4:3 (hereinafter referred to as "4:3 SD contents-signals"), and SD contents-signals of image showing the contents, the aspect ration of which is 16:9 (hereinafter referred to as "16:9 SD contents-signals") are selected and simultaneously delivered.

The 4:3 SD contents-signals are supplied to the up-converters 53. The up-converters 53 respectively convert the SD contents-signals Dsi into HD contents-signals Ds-h. The up-converters 53 also convert the aspect ratio of the image showing the contents using side-panel processing in order to prevent any lack from occurring in the image showing the contents so as to display the image properly even if the image is displayed at an aspect ratio of 16:9. Thus, the 4:3 SD contents-signals are respectively converted into the 4:3 HD contents-signals and supplied to the HD switcher 54.

The 16:9 SD contents-signals are supplied to the up-converters 53. The up-converters 53 respectively convert the SD contents-signals Dsi into HD contents-signals Ds-h. The up-converters 53 also convert the aspect ratio of the image showing the contents using top-and-bottom-cut processing in order to prevent the image showing the contents from being displayed as to be reduced from its screen even if the image is displayed at an aspect ratio of 16:9. Thus, the 16:9 SD contents-signals are respectively converted into the 16:9 HD contents-signals and supplied to the HD switcher 54.

The HD switcher 54 selects and outputs a contents-signal to be delivered. From the HD switcher 54, HD contents-signal is output so that if the HD contents-signal and the SD contents-signal, which have the same contents, are simultaneously output, the down-converter 55 converts the HD contents-signal output from the HD switcher 54 into SD contents-signal.

If the down-converter 55 converts aspect ratio of the image showing the contents using letter-box processing, when the HD switcher 54 selects the 16:9 HD contents-signal (including 16:9 HD contents-signal obtained by up-converting the 16:9 SD contents-signal), the image can be displayed without any lack in the contents therein. However, if the HD switcher 54 selects the 4:3 HD contents-signal (including 4:3 HD contents-signal obtained by up-converting the 4:3 SD contents-signal), display areas having no image are provided in the image showing the contents at upper and lower portions thereof. This causes the image showing the contents to be displayed as to be reduced from its screen, thereby resulting in that no effective image displaying by utilizing these display areas is attained.

If the down-converter 55 converts aspect ratio of the image showing the contents using sides-cut processing, when the HD switcher 54 selects the 4:3 HD contents-signal (including 4:3 HD contents-signal obtained by up-converting the 4:3 SD contents-signal), display areas having no image, which are provided on both sides of the image showing the contents, can be deleted therefrom, so that effective image displaying by utilizing these display areas can be attained. However, if the HD switcher 54 selects the 16:9 HD contents-signal (including 16:9 HD contents-signal obtained by up-converting the 16:9 SD contents-signal), the display areas of both sides of the image showing the contents are so cut away as to keep the aspect ratio thereof into 3:4. This causes any lack to occur in the image showing the contents, thereby resulting in that no proper display of the contents can be attained.

It is thus desirable to provide a system for delivering contents automatically wherein even if contents-signals that are different from each other in their formats or aspect ratios of the image showing the contents are used, less reduction in image quality can be obtained and the contents can be properly displayed by utilizing the display areas thereof effectively.

According to an embodiment of the invention, there is provided a system for delivering contents automatically. The system has a first signal-selecting-and-delivering device that selects a contents-signal from the contents-signals each having a first format of the contents-signal and delivers the contents-signal having the first format and a second signal-selecting-and-delivering device that selects a contents-signal from the contents-signals each having a second format of the contents-signal and delivers the contents-signal having the second format. The system also has a signal-supplying device that supplies the contents-signals each having the first format to the first signal-selecting-and-delivering device and the contents-signals each having the second format to the second signal-selecting-and-delivering device. The system further has a signal-converting device that converts the contents-signal output from the first signal-selecting-and-delivering device and having the first format into the contents-signal having the second format and supplies the converted contents-signal having the second format to the second signal-selecting-and-delivering device. The system has a control device that controls signal-supplying operation of the signal-supplying device and signal-selecting-and-delivering operations of the first and second signal-selecting-and-delivering devices to allow the first signal-selecting-and-delivering device to deliver the contents-signal having the first format and the second signal-selecting-and-delivering device to deliver the contents-signal having the second format, based on a predetermined delivery schedule of the contents. This enables a desired contents-signal to be converted into contents-signal with another format and to be automatically delivered. This also enables the contents-signal with a desired format to be delivered without repeating any signal conversions, so that contents having less image quality reduction can be delivered.

According to another embodiment of the invention, in this embodiment of the invention, when the first signal-selecting-and-delivering device selects and delivers the contents-signal having the first format, the contents-signal to be delivered is converted in the signal-converting device into the contents-signal having the second format, which is different from the first format, and send to the second signal-selecting-and-delivering device from which the contents-signal having the second format is delivered, thereby realizing simultaneous delivery of the same contents with separate formats.

According to further embodiment of the invention, the signal-converting device converts aspect ratios of images based on the contents-signals. When the first signal-selecting-and-delivering device selects and delivers the contents-signal having the first format, the signal-converting device converts aspect ratio of the image based on the contents-signal having the first format into aspect ratio of the image based on the contents-signal having the second format on the basis of aspect ratio of the image showing the contents of the contents-signal to be delivered, and the converted signal is then delivered from the second-selecting-and-delivering device. Thus, even if the images each showing the contents have different aspect ratios, such the images are prevented from being displayed on the screen so that they can be reduced from its screen or any lack can occur in them. Therefore, it is possible to deliver the contents that can be properly displayed by utilizing display areas effectively.

According to additional embodiment of the invention, when switching the contents to be delivered if the second signal-selecting-and-delivering device newly selects and delivers the contents-signal having the second format converted by and supplied from the signal-converting device, the contents-signal having the second format to be selected and delivered after switching the contents is beforehand supplied from the signal-supplying device to the signal-converting device through the first signal-selecting device before switching the contents, thereby allowing the contents-signal having the second format to be supplied to the second signal-selecting device at a switching time thereof. This prevents a switching shock from occurring at the switching time of the contents-signals.

The concluding portion of this specification particularly points out and directly claims the subject matter of the present invention. However, those skill in the art will best understand both the organization and method of operation of the invention, together with further advantages and objects thereof, by reading the remaining portions of the specification in view of the accompanying drawing(s) wherein like reference characters refer to like elements.

BRIEF DESCRIPTION OF THE DRAWINGS

FIG. 2 is a table diagram for illustrating relationships between images of contents to be delivered and images based on the delivery signals;

FIG. 4 is a table for showing delivery control information;

FIG. 6 is a diagram for illustrating a configuration of an important portion of another embodiment of the system for delivering contents automatically according to the invention;

FIG. 7 is a table diagram for showing operations of another embodiment of the system for delivering contents automatically according to the invention;

FIG. 9 is a table for showing control operations of the further embodiment of the system for delivering contents automatically according to the invention, thereby preventing any switching shock from occurring;

FIG. 10 is a diagram for illustrating a configuration of an important portion of additional embodiment of a system for delivering contents automatically according to the invention, thereby preventing any switching shock from occurring; and FIG. 11 is a table for showing control operations of the additional embodiment of the system for delivering contents automatically according to the invention, thereby preventing any switching shock from occurring.

DETAILED DESCRIPTION OF PREFERRED EMBODIMENTS

Figure 1:
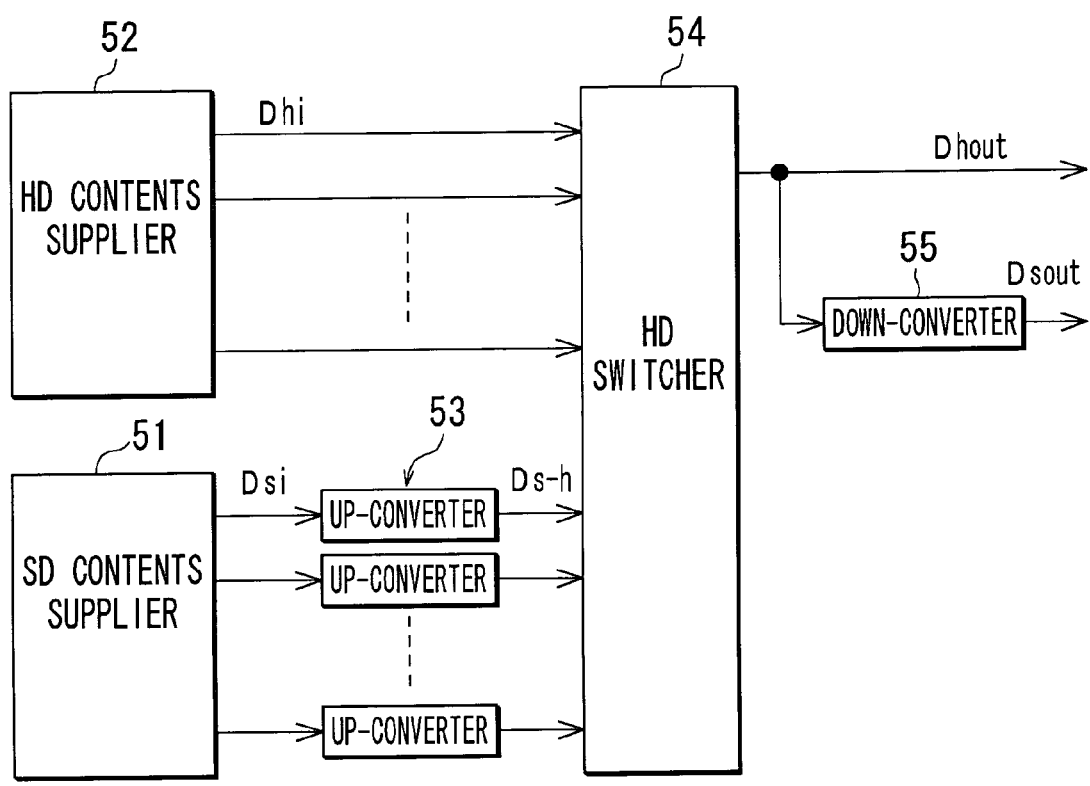
FIG. 1 is a diagram for illustrating a configuration of an important portion of a system for delivering the contents automatically according to related art.

Referring to the drawings, the invention will now be described in detail with reference to preferred embodiments of a system for delivering contents automatically according to the invention. To make the description thereof easy, the following will be described on a case where contents-signals having two formats such as SD format and HD format are delivered.

Figure 3:
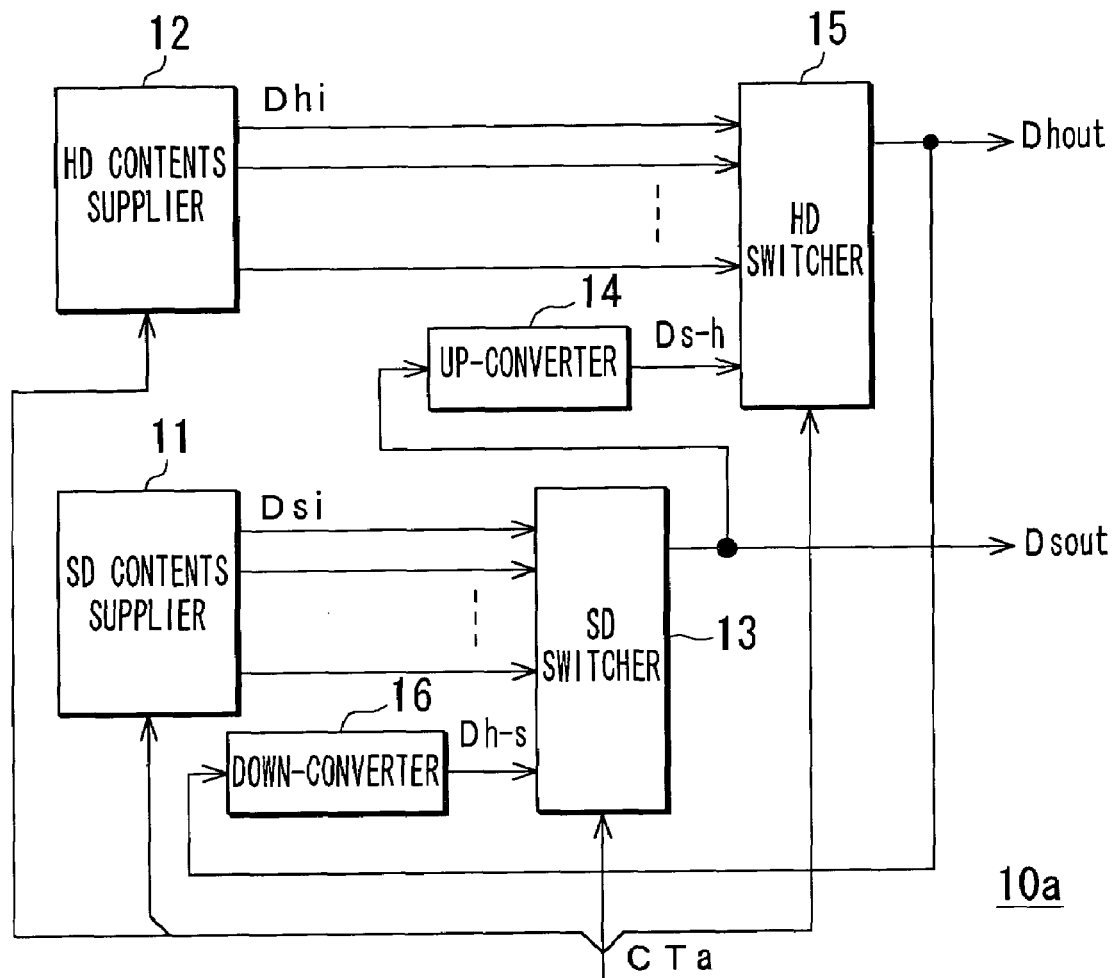
FIG. 3 is a diagram for illustrating a configuration of an important portion of an embodiment of a system for delivering contents automatically according to the invention.
Figure 3:
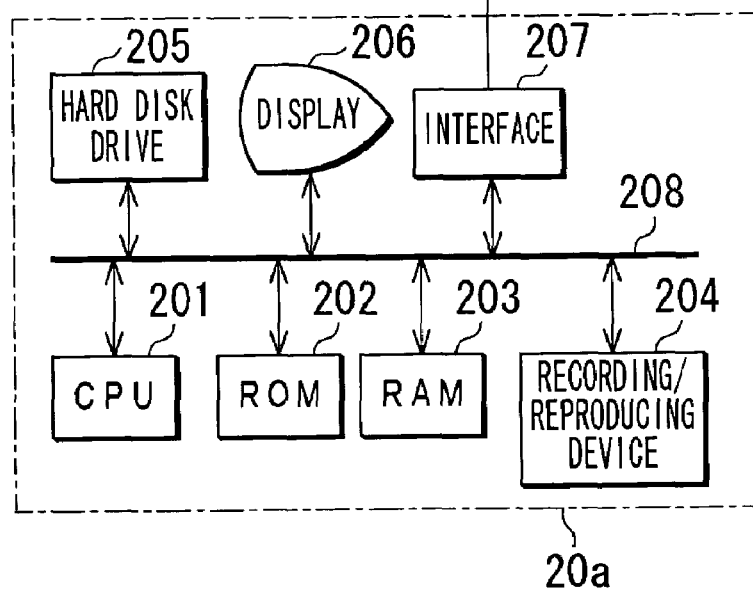

FIG. 3 illustrates a configuration of an important portion of an embodiment of the system 10a for delivering contents automatically according to the invention. The system 10a has an SD contents supplier 11 and an HD contents supplier 12 that are included in signal-supplying device, an up-converter 14 and a down-converter 16 that are included in signal-converting device, SD switcher 13 and HD switcher 15 that are included in signal-selecting-and-delivering device, and a controller 20a that is included in control device. It is to be noted that, in FIG. 3, is shown a case where the HD contents and the SD contents are simultaneously delivered by using one channel, respectively, as their channels.

The SD contents supplier 11 contains a server, video tape recorder, and the like. The SD contents supplier 11 reads out SD contents-signals Dsi stored therein and reproduces the SD contents-signals Dsi recorded thereon on the basis of a control signal CTa supplied from the controller 20a, and supplies the SD contents-signals Dsi to the SD switcher 13. It is to be noted that the following will be described supposing that as the SD contents-signals, 16:9 SD contents-signals Dsi and 4:3 SD contents-signals Dsi are used. The aspect ration of image that shows the contents based on each of the 16:9 SD contents-signals Dsi is 16:9 while the aspect ration of image that shows the contents based on each of the 4:3 SD contents-signals Dsi is 4:3.

The HD contents supplier 12 has a similar configuration as that of the SD contents supplier 11. The HD contents supplier 12 reads out HD contents-signals Dhi stored therein and reproduces the HD contents-signals Dhi recorded thereon on the basis of the control signal CTa supplied from the controller 20a, and supplies the HD contents-signals Dhi to the HD switcher 15. It is to be noted that the following will be described supposing that as the HD contents-signals Dhi, 16:9 HD contents-signals Dhi and 4:3 HD contents-signals Dhi are used. The aspect ration of image that shows the contents based on each of the 16:9 HD contents-signals Dhi is 16:9 while the aspect ration of image that shows the contents based on each of the 4:3 HD contents-signals Dhi is 4:3.

The SD switcher 13 selects an SD contents-signal to be delivered from the SD contents-signals Dsi etc. based on the control signal CTa supplied from the controller 20a. Namely, the SD switcher 13 selects an SD contents-signal from the SD contents-signals Dsi supplied from the SD contents supplier 11 and a signal Dh-s supplied from the down-converter 16 based on the control signal CTa supplied from the controller 20a, and delivers the selected signal as SD delivery signal Dsout.

The up-converter 14 converts the SD delivery signal Dsout delivered from the SD switcher 13 into a signal Ds-h having HD format. The up-converter 14 also performs an aspect-ratio-conversion, for example, in a side panel scheme (hereinafter referred to as "side-panel processing") such that black areas or the like are provided on both sides of the image or in a top-and-bottom cut scheme (hereinafter referred to as "top-and-bottom-cut processing") such that top and bottom portions of the image are cut. The signal Ds-h obtained by performing such an aspect-ratio-conversion in the up-converter 14 is supplied to the HD switcher 15.

The HD switcher 15 selects an HD contents-signal to be delivered from the HD contents-signals Dhi etc. based on the control signal CTa supplied from the controller 20a. Namely, the HD switcher 15 selects an HD contents-signal from the HD contents-signals Dhi supplied from the HD contents supplier 12 and a signal Ds-h supplied from the up-converter 14 based on the control signal CTa supplied from the controller 20a, and delivers the selected signal as HD delivery signal Dhout.

The down-converter 16 converts the HD delivery signal Dhout delivered from the HD switcher 15 into a signal Dh-s having SD format. The down-converter 16 also performs an aspect-ratio-conversion, for example, in a side cut scheme (hereinafter referred to as "side-cut processing") such that both side portions of the image are cut or in a letter box scheme (hereinafter referred to as "letter-box processing") such that black areas or the like are provided on top and bottom portions of the image.

The controller 20a has a central processing unit (CPU) 201, a read only memory (ROM) 202, a random access memory (RAM) 203, recording/reproducing device 204, a hard disk drive 205, a display 206, and an interface 207, which are connected to each other via a bus 208. It is to be noted that the controller 20a can be configured by using a nonvolatile memory and the like, which are not shown in FIG. 3.

The CPU 201 read a program out of the ROM 202, the recording/reproducing device 204, the hard disk drive 205, and the like and run it. The CPU 201 controls the display 206 to display information on the contents that is capable to be delivered. Depending on the operations of user, the CPU 201 allows delivery control information of the contents to be created and controls the RAM 203 and the hard disk drive 205 to record the created delivery control information thereon.

FIG. 4 shows delivery control information created in the controller 20a. The delivery control information includes scheduled delivery start time, contents title to be delivered at the scheduled delivery start time, storage information including storage position and record position of the contents, specification information including a format and an aspect ratio for the contents, start address information of the contents and the like. It is to be noted that the delivery control information is not limited to the above, but can include any other information.

The controller 20a allows for performing delivery preparation and delivery processing of the corresponding contents automatically based on the delivery control information. Namely, the controller 20a creates a control signal CTa based on the delivery control information and supplies the created control signal CTa to the SD contents supplier 11 and the HD contents supplier 12 to allow for cuing the corresponding contents-signals in order of the scheduled delivery start times so that the contents-signals can be delivered at their scheduled delivery start times.

Next, the controller 20a also controls the operations of the SD contents supplier 11 and the HD contents supplier 12 by using the control signal CTa when it is the scheduled delivery start time, and controls the SD contents supplier 11 to supply to the SD switcher 13 and/or the HD switcher 15 the contents-signal that is delivered at the scheduled delivery start time. Further, the controller 20a controls operations of the SD switcher 13 and the HD switcher 15 based on the control signal CTa to select contents-signal to be delivered at the scheduled delivery start time by the SD switcher 13 and/or the HD switcher 15, thereby allowing the contents-signals to be automatically delivered based on the contents delivery schedule indicated by the delivery control information.

Figure 5:
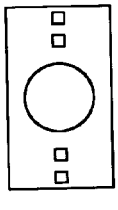
FIG. 5 is a table diagram for showing operations of an embodiment of the system for delivering contents automatically according to the invention.

Next, the following will be described on the operations of the system 10a for delivering contents automatically with reference to FIG. 5.

If the contents to be delivered relate to 16:9 HD contents or 4:3 HD contents, the controller 20a controls the HD switcher 15 to select a desired HD contents-signal from the HD contents-signals, which the HD contents supplier 12 supplies to the HD switcher 15, and to deliver the selected HD contents-signal as HD delivery signal Dhout. Thus, the HD contents-signal is delivered as the HD delivery signal Dhout, so that the HD contents can be properly displayed without any lack occurs in the image showing the contents or the image showing the contents is displayed as to be reduced from its screen. In this embodiment, the down-converter 16 converts a format of the desired HD contents-signal into SD format thereof so that the SD switcher 13 can deliver it as SD delivery signal Dsout, thereby allowing the SD delivery signal Dsout and the HD delivery signal Dhout to be simultaneously delivered.

If the contents to be delivered relate to 4:3 SD contents or 16:9 SD contents, the controller 20a controls the SD switcher 13 to select a desired SD contents-signal from the SD contents-signals, which the SD contents supplier 11 supplies to the SD switcher 13, and to deliver the selected SD contents-signal as SD delivery signal Dsout. Thus, the SD contents-signal can be properly displayed based on the SD delivery signal Dsout without any lack occurs in the image showing the contents or the image showing the contents is displayed as to be reduced from its screen. In this embodiment, it is not necessary to convert SD format of the SD contents-signal into the HD format thereof and then convert this HD format into SD format again like the past system for delivering contents automatically, so that SD delivery signal Dsout can be delivered without any image quality reduction. The up-converter 14 converts the SD format of the desired SD contents-signal into HD format thereof so that the HD switcher 15 can deliver it as HD delivery signal Dhout, thereby allowing the SD delivery signal Dsout and the HD delivery signal Dhout to be simultaneously delivered.

Thus, as one delivery signal, a signal supplied from the contents supplier is used and, as the other delivery signal, a signal which the contents supplier supplies and is converted by the converter is used, thereby allowing the signals to be simultaneously delivered. This avoids using any signal that is repeatedly converted, so that it is possible to deliver the contents having less image quality reduction.

Alternatively, in the system 10a as shown in FIG. 3, if the down-converter 16 performs side-cut processing, both sides of the contents image based on the SD delivery signal Dsout can be cut away when 16:9 HD contents-signal is delivered. This causes lack to occur in the image showing the contents. Further, if the down-converter 16 performs letter-box processing, black areas or the like are provided on top and bottom portions of the contents image based on the SD delivery signal Dsout when 4:3 HD contents-signal is delivered so that the image showing the contents can be displayed as to be reduced from its screen.

If the up-converter 14 performs side-panel processing, black areas or the like are provided on both sides of the contents image based on the HD delivery signal Dhout when 16:9 SD contents-signal is delivered, so that the image showing the contents can be displayed as to be reduced from its screen. Further, if the up-converter 14 performs top-and-bottom-cut processing, top and bottom portions of the contents image based on the HD delivery signal Dhout can be cut away when 4:3 SD contents-signal is delivered. This causes lack to occur in the image showing the contents.

In order to overcome the above, an up-converter performing the side-panel processing and an up-converter performing the top-and-bottom-cut processing as well as a down-converter performing the side-cut processing and a down-converter performing the letter-box processing are provided and a signal, aspect ratio of which is converted depending on that of the contents to be delivered, is selected by the switchers. This prevents lack from occurring in the image showing the contents and the image showing the contents from being displayed as to be reduced from its screen.

FIG. 6 illustrates a configuration of an important portion of another embodiment of the system 10b for delivering the contents automatically according to the invention, which prevents lack from occurring in the image showing the contents and the image showing the contents from being displayed as to be reduced from its screen. It is to be noted that, in FIG. 6, like symbol or number is attached to like components corresponding to those shown in FIG. 3, detailed description of which will be omitted. Controller 20b has a configuration similar to that of the controller 20a without control operations of the SD switcher 13 and the HD switcher 15.

In FIG. 6, the SD switcher 13 selects an SD contents-signal to be delivered from the SD contents-signals Dsi etc. based on the control signal CTb supplied from the controller 20b. Namely, the SD switcher 13 selects an SD contents-signal from the SD contents-signals Dsi supplied from the SD contents supplier 11, a signal Dh-ssc supplied from down-converter 16sc, which will be described later, and a signal Dh-slt supplied from down-converter 16lt, which will be described later, based on the control signal CTb supplied from the controller 20b, and delivers the selected signal as SD delivery signal Dsout.

The up-converter 14sp converts a format of the SD delivery signal Dsout delivered from the SD switcher 13 into HD format thereof and also performs the side-panel processing thereon as well as supplies the processed signal Ds-hsp to the HD switcher 15. The up-converter 14tb converts a format of the SD delivery signal Dsout delivered from the SD switcher 13 into HD format thereof and also performs the top-and-bottom-cut processing thereon as well as supplies the processed signal Ds-htb to the HD switcher 15.

The HD switcher 15 selects an HD contents-signal to be delivered from the HD contents-signals Dhi etc. based on the control signal CTb supplied from the controller 20b. Namely, the HD switcher 15 selects an HD contents-signal from the HD contents-signals Dhi supplied from the HD contents supplier 12, a signal Ds-hsp supplied from the up-converter 14sp, and a signal Ds-htb supplied from up-converter 14tb based on the control signal CTb supplied from the controller 20b, and delivers the selected signal as HD delivery signal Dhout.

The down-converter 16sc converts a format of the HD delivery signal Dhout delivered from the HD switcher 15 into SD format thereof and also performs side-cut processing thereon as well as supplies the processed signal Dh-ssc to the SD switcher 13. The down-converter 16*lt* converts a format of the SD delivery signal Dsout delivered from the SD switcher 15 into SD format thereof and also performs the letter-box processing thereon as well as supplies the processed signal Dh-slt to the SD switcher 13.

The controller 20*b* controls the SD switcher 13 and the HD switcher 15 to deliver the contents-signal by selection of the up-converter 14*sp* or the up-converter 14*tb* and the selection of the down-converter 16*sc* or the down-converter 16*lt* based on the specification information of the contents, whereby no lack occurs in the image showing the contents and the image showing the contents is not displayed as to be reduced from its screed.

Next, the following will be described on the operations of the system 10*b* for delivering contents automatically with reference to FIG. 7.

If the contents to be delivered relate to 16:9 HD contents or 4:3 HD contents, the controller 20*b* controls the HD switcher 15 to select a desired HD contents-signal from the HD contents-signals Dhi, which the HD contents supplier 12 supplies to the HD switcher 15, and to deliver the selected HD contents-signal Dhi as HD delivery signal Dhout. Thus, the selected HD contents-signal Dhi is delivered as the HD delivery signal Dhout, so that the HD contents can be properly displayed without any image quality reduction occurs, any lack occurs in the image showing the contents or the image showing the contents is displayed as to be reduced from its screen.

In this embodiment, the controller 20*b* controls the SD switcher 13 to switch its switching operations depending on whether the contents to be delivered are 16:9 HD contents or 4:3 HD contents. Namely, if the contents to be delivered are 16:9 HD contents, both sides of the contents image based on the SD delivery signal Dsout are cut away when the SD switcher 13 selects the signal Dh-ssc supplied from the down-converter 16*sc* to deliver it as the SD delivery signal Dsout, thereby causing any lack to occur in the image showing the contents. Thus, the controller 20*b* controls the SD switcher 13 to select the signal Dh-slt supplied from the down-converter 16*lt* to deliver it as the SD delivery signal Dsout when the contents to be delivered are 16:9 HD contents. In this moment, the image based on the SD delivery signal Dsout becomes image of 16:9 HD contents in which no lack occurs in the image showing the contents.

If the contents to be delivered relate to 4:3 HD contents, the image based on the SD delivery signal Dsout is displayed as to be reduced from the screen thereof when the SD switcher 13 selects the signal Dh-slt supplied from the down-converter 16*lt* to deliver it as the SD delivery signal Dsout. Thus, the controller 20*b* controls the SD switcher 13 to select the signal Dh-ssc supplied from the down-converter 16*sc* and deliver it as SD delivery signal Dsout when the contents to be delivered are 4:3 HD contents. In this moment, the image based on the SD delivery signal Dsout becomes image of 4:3 HD contents, which is not displayed as to be reduced from the screen thereof.

If the contents to be delivered relate to 4:3 SD contents or 16:9 SD contents, the controller 20*b* controls the SD switcher 13 to select a desired SD contents-signal from the SD contents-signals Dsi, which the SD contents supplier 11 supplies to the SD switcher 13, and to deliver the selected SD contents-signal Dsi as SD delivery signal Dsout. Thus, the SD switcher 13 delivers the selected SD contents-signal Dsi as the SD delivery signal Dsout so that the image based on the SD contents can be properly displayed based on the SD delivery signal Dsout without any image quality reduction occurs, any lack occurs in the image showing the contents or the image showing the contents is displayed as to be reduced from its screen. It is not necessary to convert SD format of the SD contents-signal into the HD format thereof and then convert this HD format into SD format again, so that SD delivery signal Dsout can be delivered without any image quality reduction.

In this embodiment, the controller 20*b* controls the HD switcher 15 to switch its switching operations depending on whether the contents to be delivered are 16:9 SD contents or 4:3 SD contents. Namely, if the contents to be delivered are 4:3 SD contents, top and bottom portions of the contents image based on the HD delivery signal Dhout are cut away when the HD switcher 15 selects the signal Ds-htb supplied from the up-converter 14*tb* to deliver it as the HD delivery signal Dhout, thereby causing lack to occur in the image showing the contents. Thus, the controller 20*b* controls the HD switcher 15 to select the signal Ds-hsp supplied from the up-converter 14*sp* to deliver it as the HD delivery signal Dhout when the contents to be delivered are 4:3 SD contents. In this moment, the image based on the HD delivery signal Dhout becomes image of 4:3 SD contents in which no lack occurs in the image showing the contents.

If the contents to be delivered are 16:9 SD contents, the image based on the HD delivery signal Dhout is displayed as to be reduced from the screen thereof when the HD switcher 15 selects the signal Ds-hsp supplied from the up-converter 14*sp* to deliver it as the HD delivery signal Dhout. Thus, the controller 20*b* controls the HD switcher 15 to select the signal Ds-htb supplied from the up-converter 14*tb* and deliver it as HD delivery signal Dhout when the contents to be delivered are 16:9 SD contents. In this moment, the image based on the HD delivery signal Dhout becomes image of 16:9 SD contents, which is not displayed as to be reduced from the screen thereof.

Thus, when the SD switcher 13 selects the contents-signal having SD format and delivers it, the HD switcher 15 selects and delivers the signal converted in its aspect ratio by the up-converter 14 sp or 14*tb* depending on the aspect ratio of the image showing the contents on which this contents-signal to be delivered is based. When the HD switcher 15 selects the contents-signal having HD format and delivers it, the SD switcher 13 selects and delivers the signal converted in its aspect ratio by the down-converter 16*sc* or 16*lt* depending on the aspect ratio of the image showing the contents on which the contents-signal to be delivered is based. This allows the contents to be delivered without any lack occurs in the image showing the contents or the image showing the contents is displayed as to be reduced from the screen thereof.

In the meanwhile, as described above, if simultaneous delivery is carried out such that the delivery signal is supplied to the converter where the delivery signal is converted in its format and its aspect ratio and the signal output from the converter is used as the other delivery signal and it takes long to convert it in its format and aspect ratio, any switching shock may occur when the switcher switches the contents. For example, if HD contents are delivered simultaneously, the HD delivery signal Dhout that the HD switcher 15 selects is supplied to the down-converters 16*sc* and 16*lt*. In this moment, if it takes long to supply the HD delivery signal Dhout to the down-converter 16*sc* or 16*lt* and to output the converted signal Dh-s (Dh-ssc or Dh-slt) therefrom when synchronizing the switching operation of the SD switcher 13 with that of the HD switcher 15, the SD switcher 13 has already switched before the converted delivery signal Dh-s is supplied thereto, thereby causing the switching shock.

Thus, the controller 20*b* allows for previously supplying the contents-signal to be delivered after the switching to the up-converter 14*sp* or 14*tb* or the down-converter 16*sc* or 16*lt* before the switching timing thereof, so that the converted signal can be supplied to the HD or SD switcher at the switching timing thereof, thereby prevents the switching shock from occurring.

For example, the contents-signal to be delivered after the switching is supplied to the up-converter 14*sp* or 14*tb* or the down-converter 16*sc* or 16*lt* before some frames or seconds. Namely, read or reproduction of the contents-signal to be delivered after the switching is performed at timing by m frames from a point by m frames (m is integer) before the switching timing based on the delivery control information. In this case, since the contents-signal has been supplied to the up-converter 14*sp* or 14*tb* or the down-converter 16*sc* or 16*lt* before the switching timing, the switching shock is prevented when the contents are switched at the switching timing based on the delivery control information. Further, when the contents are switched at the switching timing based on the delivery control information, the switched contents can be delivered at a desired point.

Figure 8:
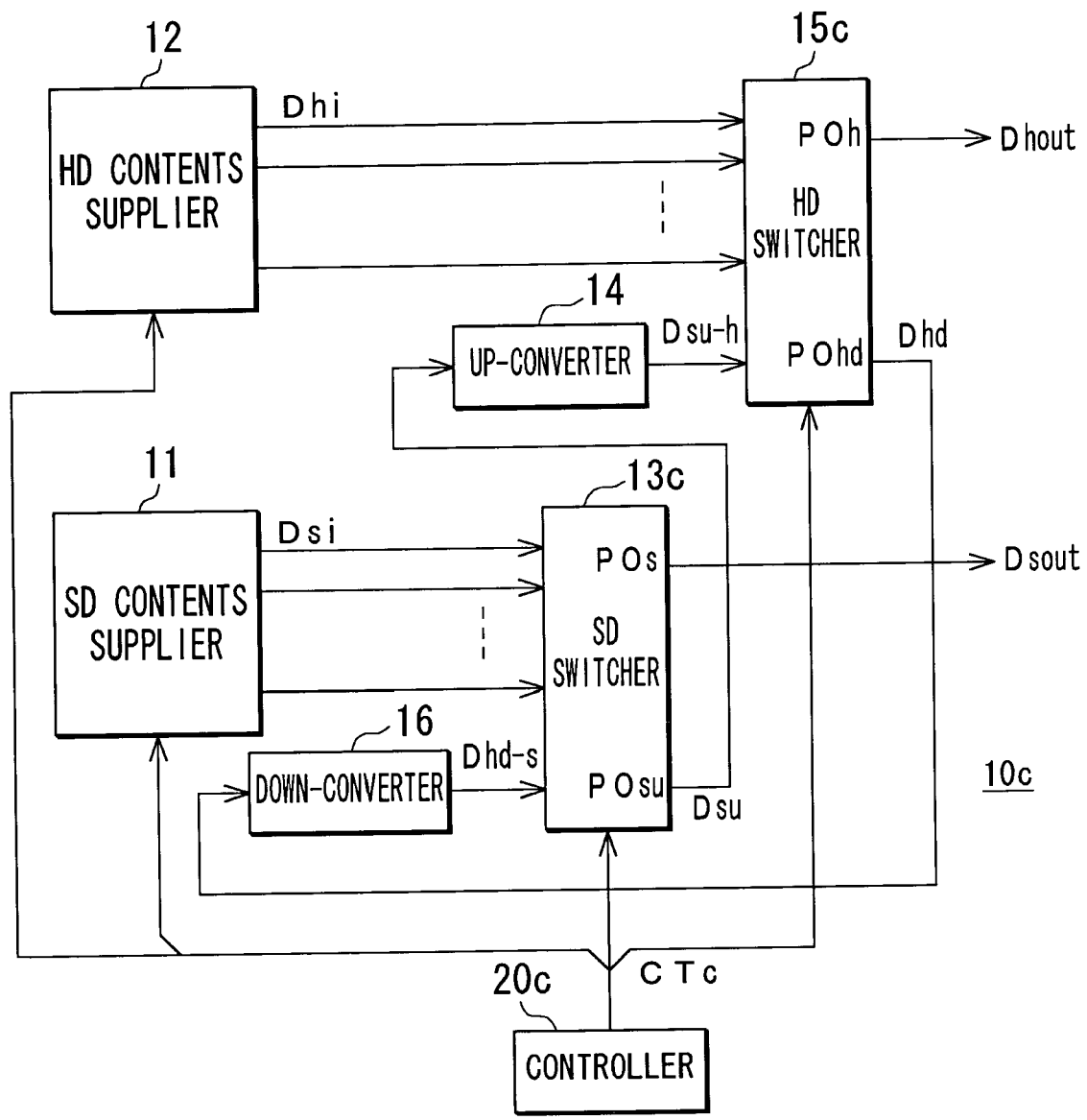
FIG. 8 is a diagram for illustrating a configuration of an important portion of further embodiment of a system for delivering contents automatically according to the invention, thereby preventing any switching shock from occurring.

FIG. 8 illustrates a configuration of an important portion of further embodiment of a system 10*c* for delivering contents automatically according to the invention, which prevents any switching shock from occurring. It is to be noted that, in FIG. 8, a case where each one up-converter and down-converter is provided, and like symbol or number is attached to like components corresponding to those shown in FIG. 3, detailed description of which will be omitted. Controller 20*c* has a configuration similar to that of the controller 20*a* without control operations on the SD supplier 11 and the HD supplier 12 and the SD switcher 13*c* and the HD switcher 15*c*.

The SD switcher 13*c* has a delivery port POs for delivering the SD delivery signal Dsout, and an HD conversion output port POsu for outputting a signal Dsu to be used for conversion in the up-converter 14. The SD switcher 13*c* separately switches between the SD delivery signal Dsout delivered from the delivery port POs and the signal Dsu output from the HD conversion output port POsu based on a control signal CTc from the controller 20*c*. For example, if using a matrix type switcher as the SD switcher 13*c*, it is possible to switch the signals output from the respective ports separately.

The up-converter 14 converts a format of the signal Dsu output from the HD conversion output port POsu of the SD switcher 13*c* into HD format thereof and converts its aspect ratio into appropriate one to supply the converted signal Dsu-h to the HD switcher 15*c*.

The HD switcher 15*c* has a delivery port POh for delivering HD delivery signal Dhout, and an HD conversion output port POhd for outputting a signal Dhd to be used for conversion processing in the down-converter 16. The HD switcher 15*c* separately switches between the HD delivery signal Dhout delivered from the delivery port POh and the signal Dhd output from the SD conversion output port POhd based on the control signal CTc from the controller 20*c*. For example, if using a matrix type switcher as the HD switcher 15*c*, it is possible to switch the signals output from the respective ports separately.

The down-converter 16 converts a format of the signal Dhd output from the SD conversion output port POhd of the HD switcher 15*c* into SD format thereof and converts its aspect ratio into appropriate one to supply the converted signal Dhd-s to the SD switcher 13*c*.

FIG. 9 shows control operations of the above embodiment of the system 10*c* for delivering the contents automatically according to the invention, which prevents any switching shock from occurring. If the contents to be delivered are switched from HD contents to the other HD contents, the SD switcher 13*c* has selected the signal Dhd-s supplied from the down-converter 16 before the contents to be delivered are switched, and output it as SD delivery signal Dsout from the delivery port POs. Thus, it is unnecessary to have switching operation for selecting a signal newly supplied from the down-converter 16 by the SD switcher 13*c* when switching the contents, thereby preventing any switching shock from occurring. Therefore, the controller 20*c* controls the HD switcher 15*c* to switch between the signals, which are output from the delivery port POh and the SD conversion output port POhd in the HD switcher 15, at the switching timing based on the delivery control information. It is to be noted that in FIGS. 9 and 11, a case where the switching is carried out at the switching timing based on the delivery control information is referred to as "JUST" and a case where the switching is carried out before the switching timing based on the delivery control information is referred to as "FAST".

If the contents to be delivered are switched from HD contents to SD contents, it is necessary that the HD switcher 15*c* selects a signal Dsu-h supplied from the up-converter 14 instead of HD contents-signal. In this case, if a supply of the signal Dsu-h from the up-converter 14 to the HD switcher 15*c* is delayed as compared with the switching timing based on the delivery control information, any switching shock may occur when the HD switcher 15*c* switches. Thus, the controller 20*c* controls the SD supplier 11 to supply the SD contents-signal Dsi to be newly delivered from the SD supplier 11 to the SD switcher 13*c* at a faster timing than the switching timing based on the delivery control signal and controls the SD switcher 13*c* to supply the signal Dsu to the up-converter 14 from the HD conversion output port POsu. Namely, at the switching timing thereof, the converted signal Dsu-h has been supplied to the HD switcher 15*c* from the up-converter 14. Thus, when the SD contents-signal Dsi to be newly supplied is supplied to the up-converter 14 at a faster timing than the switching timing and the converted signal Dsu-h is supplied to the HD switcher 15*c*, any switching shock may not occur if the HD contents-signal Dhi is switched to the signal Dsu-h supplied from the up-converter 14 at the switching timing thereof based on the delivery control information. Further, because no switching shock occur, the SD delivery signal Dsout output from the delivery port POs in the SD switcher 13*c* and the HD delivery signal Dhout output from the delivery port POh in the HD switcher 15*c* can be switched at the switching timing based on the delivery control information.

Next, if the contents to be delivered are switched from SD contents to HD contents, it is necessary that the SD switcher 13*c* selects a signal Dhd-s supplied from the down-converter 16 instead of SD contents-signal. In this case, if a supply of the signal Dhd-s from the down-converter 16 to the SD switcher 13*c* is delayed as compared with the switching timing based on the delivery control information, any switching shock may occur when the SD switcher 13*c* switches. Thus, the controller 20*c* controls the HD supplier 12 to supply the HD contents-signal Dhi to be newly delivered from the HD supplier 12 to the HD switcher 15*c* at a faster timing than the switching timing based on the delivery control signal and controls the HD switcher 15*c* to supply the signal Dhd to the down-converter 16 from the SD conversion output port POhd. Namely, at the switching timing thereof, the converted signal Dhd-s has been supplied to the SD switcher 13*c* from the down-converter 16. Thus, when the HD contents-signal Dhi to be newly supplied is supplied to the down-converter 16 at a faster timing than the switching timing and the converted signal Dhd-s is supplied to the SD switcher 13*c*, any switching shock may not occur if the SD contents-signal Dsi is switched to the signal Dhd-s supplied from the down-converter 16 at the switching timing thereof based on the delivery control information. Further, because no switching shock occur, the SD delivery signal Dsout output from the delivery port POs in the SD switcher 13c and the HD delivery signal Dhout output from the delivery port POh in the HD switcher 15c can be switched at the switching timing based on the delivery control information.

When the contents to be delivered are switched from SD contents to the other SD contents, the HD switcher 15c has selected a signal Dsu-h supplied from the up-converter 14 before the contents to be delivered are switched and outputs it as the HD delivery signal Dhout from the delivery port POh thereof. Thus, it is unnecessary to have switching operation for newly selecting a signal Dsu-h supplied from the up-converter 14 by the HD switcher 15c when switching the contents, thereby preventing any switching shock from occurring. Therefore, the controller 20c controls the SD switcher 13c to switch between the signals, which are output from the delivery port POs and the HD conversion output port POsu in the SD switcher 13c, at the switching timing based on the delivery control information.

Thus, when the contents-signal supplied from the contents supplier are switched to the signal supplied from the converter on switching of the delivery contents, the switcher previously receives the converted signal from the converter, thereby surely preventing the switching shock from occurring.

Also, the embodiment of this system 10c for delivering the contents automatically can similarly prevent the switching shock from occurring in a case where a signal in which conversion of aspect ratio is appropriately performed depending on the aspect ratio of the contents is delivered.

FIG. 10 illustrates a configuration of an important portion of additional embodiment of a system 10d for delivering the contents automatically according to the invention, which prevents any switching shock from occurring. In this embodiment, a signal converted in its aspect ratio depending on the aspect ratio of the image showing the contents is delivered. This system 10d has respectively an up-converter 14sp for performing as the aspect ratio conversion the side-panel processing, an up-converter 14tb for performing as the aspect ration conversion the top-and-bottom-cut processing, a down-converter 16sc for performing as the aspect ration conversion the sides-cut processing, and a down-converter 16lt for performing as the aspect ratio conversion the letter-box processing. The system 10d can prevent image quality from being reduced, lack from occurring in the image showing the contents, the image showing the contents from being displayed as to be reduced from the screen thereof, and the switching shock from occurring. It is to be noted that, in FIG. 10, like symbol or number is attached to like components corresponding to those shown in FIG. 3, detailed description of which will be omitted. Controller 20d has a configuration similar to that of the controller 20a without control operations of the SD supplier 11 and the HD supplier 12 as well as the SD switcher 13d and the HD switcher 15d.

The SD switcher 13d has a delivery port POs for delivering the SD delivery signal Dsout, HD conversion output port POsa for outputting a signal Dsua to be used for conversion processing in the up-converter 14sp, and HD conversion output port POsb for outputting a signal Dsub to be used for conversion processing in the up-converter 14tb. The SD switcher 13d also separately switches among SD delivery signal Dsout to be delivered from the delivery port POs, the signal Dsua output from the HD conversion output port POsa, and the signal Dsub output from the HD conversion output port POsb, based on a control signal CTd supplied from the controller 20d.

The up-converter 14sp converts a format of the signal Dsua output from the HD conversion output port POsa in the SD switcher 13d into HD format thereof and also performs the side-panel processing thereon as well as supplies the processed signal Dsu-hsp to the HD switcher 15d. The up-converter 14tb converts a format of the signal Dsub output from the HD conversion output port POsb in the SD switcher 13d into HD format thereof and also performs the top-and-bottom-cut processing thereon as well as supplies the processed signal Dsu-htb to the HD switcher 15d.

The HD switcher 15d has a delivery port POh for delivering an HD delivery signal Dhout, an SD conversion output port POha for outputting a signal Dhda to be used for conversion processing in the down-converter 16sc, and an SD conversion output port POhb for outputting a signal Dhdb to be used for conversion processing in the down-converter 16lt. The HD switcher 15d separately switches among the HD delivery signal Dhout delivered from the delivery port POh, the signal Dhda output from the SD conversion output port POha, and the signal Dhdb output from the SD conversion output port POhb, based on the control signal CTd supplied from the controller 20d.

The down-converter 16sc converts a format of the signal Dhda output from the SD conversion output port POha in the HD switcher 15 into SD format thereof and also performs side-cut processing thereon as well as supplies the processed signal Dhd-ssc to the SD switcher 13d. The down-converter 16lt converts a format of the signal Dhdb output from the SD conversion output port POhb in the HD switcher 15d into SD format thereof and also performs the letter-box processing thereon as well as supplies the processed signal Dhd-slt to the SD switcher 13d.

FIG. 11 illustrates the control operations of this embodiment of the system 10d for delivering the contents automatically, which prevents the switching shock from occurring. Herein, it is estimated that the signals output from the up-converters 14sp and 14tb and the down-converters 16sc and 16lt are selected as shown in FIG. 7 based on the specification information of the delivering contents in the SD switcher 13d and the HD switcher 15d before switching the contents, thereby delivering the contents-signal with preventing lack from occurring in the image showing the contents and the image showing the contents from being displayed as to be reduced from the screen thereof.

Note that the 16:9 HD contents-signal Dhi1 supplied to, for example, an input port PIh1 of the HD switcher 15d is switched to the 16:9 HD contents-signal Dhi2 to be supplied to an input port PIh2 of the HD switcher 15d (see CASE 1 shown in FIG. 11).

In this CASE 1, since the 16:9 HD contents-signal has been delivered before the switching, the SD switcher 13d selects a signal Dhd-slt supplied from the down-converter 16lt to the input port PIsb to deliver the SD delivery signal Dsout in order to prevent lack form occurring in the image showing the contents. Since the 16:9 HD contents-signal is also delivered after the switching, it is unnecessary to switch the signals in the SD switcher 13d. It is to be noted that a term, "CONT" is used in FIG. 11 if it is unnecessary to switch the signals. It is also to be noted that a description, shown in FIG. 11, under the term, "CONT" indicates an input port to be selected.

The controller 20d controls the HD switcher 15d to convert the contents-signals at the switching timing based on the delivery control information so that the HD delivery signal Dhout to be delivered from the delivery port POh can be switched from the 16:9 HD contents-signal Dhi1 that is supplied to the input port PIh1 to the 16:9 HD contents-signal Dhi2 that is supplied to the input port PIh2 (a description, "A→B" under the term, "JUST" shown in FIG. 11 indicates an order of switching the input ports to be selected, which is similar to the following). The signal Dhdb output from the SD conversion output port POhb can be switched from the 16:9 HD contents-signal Dhi1 that is supplied to the input port PIh1 to the 16:9 HD contents-signal Dhi2 that is supplied to the input port PIh2, at the switching timing based on the delivery control information.

Therefore, the contents to be simultaneously delivered are switched from the 16:9 HD contents-signal supplied to the input port PIh1 to the 16:9 HD contents-signal supplied to the input port PIh2 at the switching timing thereof. Since no signal is switched in the SD switcher 13d, no switching shock occurs in the image based on the SD delivery signal Dsout.

Note that the 16:9 HD contents-signal Dhi1 supplied to, for example, the input port PIh1 of the HD switcher 15d is switched to the 4:3 HD contents-signal Dhi4 to be supplied to an input port PIh4 of the HD switcher 15d (see CASE 2 shown in FIG. 11).

In this CASE 2, since the 16:9 HD contents-signal has been delivered before the switching, the SD switcher 13d selects a signal Dhd-slt supplied to the input port PIsb from the down-converter 16lt to deliver it as the SD delivery signal Dsout in order to prevent lack from occurring in the image showing the contents. After switching, it is necessary that the HD switcher 15d selects the 4:3 HD contents-signal Dhi4 having a different aspect ratio therefrom. Thus, it is necessary that the SD switcher 13d selects the signal Dhd-ssc supplied from the down-converter 16sc to the input port PIsa and delivers it as the SD delivery signal Dsout instead of the signal Dhd-slt supplied from the down-converter 16lt to the input port PIsb in order to prevent the image from being displayed as to be reduced from the screen thereof. If a supply of the signal Dhd-ssc from the down-converter 16sc is delayed from the switching timing based on the delivery control information, any switching shock may occur when the SD switcher 13d switches the signals at this switching timing.

Thus, the controller 20d controls the HD contents supplier 12 to supply the 4:3 HD contents-signal Dhi4 to the input port PIh4 of the HD switcher 15d before the switching timing based on the delivery control information and supply this 4:3 HD contents-signal Dhi4 thus supplied to the input port PIh4 to the down-converter 16sc as a signal Dhda via the SD conversion output port POha. (a description, "→B" under the term, "FAST" shown in FIG. 11 indicates an input port to which the contents-signal has been supplied before the switching timing, which is similar to the following).

Thereafter, the controller 20d controls the HD switcher 15d to switch the contents-signals at the switching timing based on the delivery control information so that the HD delivery signal Dhout to be delivered from the delivery port POh can be switched from the 16:9 HD contents-signal Dhi1 supplied to the input port PIh1 to the 4:3 HD contents-signal Dhi4 supplied to the input port PIh4. Further, the controller 20d controls the SD switcher 13d to switch the contents-signals at the switching timing based on the delivery control information so that the SD contents-signal Dsout to be delivered form the delivery port POs can be switched from the signal Dhd-slt supplied from the down-converter 161t to the input port PIsb to the signal Dhd-ssc supplied from the down-converter 16sc to the input port PIsa.

Therefore, the contents to be simultaneously delivered are switched from the 16:9 HD contents-signal supplied to the input port PIh1 to the 4:3 HD contents-signal supplied to the input port PIh4 at the switching timing thereof. Since the signals are switched after the down-converter 16sc supplies the signal Dhd-ssc to the input port PIsa in the SD switcher 13d, no switching shock occurs in an image based on the SD delivery signal Dsout and no image is displayed as to be reduced from the screen thereof.

Note that the 4:3 HD contents-signal Dhi3 supplied to, for example, the input port PIh3 of the HD switcher 15d is switched to the 16:9 HD contents-signal Dhi2 to be supplied to the input port PIh2 of the HD switcher 15d (see CASE 3 shown in FIG. 11).

In this CASE 3, since the 4:3 HD contents-signal has been delivered before the switching, the SD switcher 13d selects a signal Dhd-ssc supplied from the down-converter 16sc to the input port PIsa to deliver it as the SD delivery signal Dsout in order to prevent the image fro being displayed as to be reduced from the screen thereof. After switching, it is necessary to selects the 16:9 HD contents-signal Dhi2 having a different aspect ratio therefrom. Thus, it is necessary that the SD switcher 13d selects the signal Dhd-slt supplied from the down-converter 16lt to the input port PIsb and delivers it as the SD delivery signal Dsout instead of the signal Dhd-ssc supplied from the down-converter 16sc to the input port PIsa in order to prevent any lack from occurring in the image. If a supply of the signal Dhd-slt from the down-converter 16lt is delayed from the switching timing based on the delivery control information, any switching shock may occur when the SD switcher 13d switches the signals at this switching timing.

Thus, the controller 20d controls the HD contents supplier 12 to supply the 16:9 HD contents-signal Dhi2 from the HD contents supplier 12 to the input port PIh2 in the HD switcher 15d before the switching timing based on the delivery control information, and controls the HD switcher 15d to supply the 16:9 HD contents-signal Dhi2 thus supplied to this input port PIh2 to the down-converter 16lt as the signal Dhdb via the SD conversion output port POhb. The controller 20d then controls the HD switcher 15d to switch the contents-signals at the switching timing based on the delivery control information so that the HD delivery signal Dhout to be delivered from the delivery port POh can be switched from the 4:3 HD contents-signal Dhi3 supplied to the input port PIh3 to the 16:9 HD contents-signal Dhi2 supplied to the input port PIh2. Further, the controller 20d controls the SD switcher 13d to switch the contents-signals at the switching timing based on the delivery control information so that the SD contents-signal Dsout to be delivered from the delivery port POs can be switched from the signal Dhd-ssc supplied from the down-converter 16sc to the input port PIsa to the signal Dhd-slt supplied from the down-converter 16lt to the input port PIsb.

Therefore, the contents to be simultaneously delivered are switched from the 4:3 HD contents-signal supplied to the input port PIh3 to the 16:9 HD contents-signal supplied to the input port PIh2 at the switching timing thereof. Since the signals are switched after the down-converter 16lt supplies the signal Dhd-slt to the input port PIsb in the SD switcher 13d, no switching shock occurs in an image based on the SD delivery signal Dsout and no lack occurs in the image showing the contents.

Note that the 4:3 HD contents-signal Dhi3 supplied to, for example, the input port PIh3 of the HD switcher 15d is switched to the 4:3 HD contents-signal Dhi4 to be supplied to the input port PIh4 of the HD switcher 15d (see CASE 4 shown in FIG. 11).

In this CASE 4, since the 4:3 HD contents-signal has been delivered before the switching, the SD switcher 13d selects a signal Dhd-ssc supplied from the down-converter 16sc to the input port PIsa to deliver it as the SD delivery signal Dsout in order to prevent the image showing the contents from being displayed as to be reduced from the screen thereof. Since the 4:3 HD contents-signal is also delivered after the switching, it is unnecessary to switch the signals in the SD switcher 13*d*.

Thus, the controller 20*d* controls the HD switcher 15*d* to switch the contents-signals at the switching timing based on the delivery control information so that the HD delivery signal Dhout to be delivered from the delivery port POh can be switched from the 4:3 HD contents-signal Dhi3 supplied to the input port PIh3 to the 4:3 HD contents-signal Dhi4 supplied to the input port PIh4. The controller 20*d* also controls the HD switcher 15*d* to switch the contents-signals so that the signal Dhda to be output from the SD conversion output port POha can be switched from the 4:3 HD contents-signal Dhi3 supplied to the input port PIh3 to the 4:3 HD contents-signal Dhi4 supplied to the input port PIh4 at the switching timing based on the delivery control information.

Therefore, the contents to be simultaneously delivered are switched from the 4:3 HD contents-signal supplied to the input port PIh3 to the 4:3 HD contents-signal supplied to the input port PIh4 at the switching timing thereof. Since the SD switcher 13*d* switches no signal, no switching shock occurs in an image based on the SD delivery signal Dsout.

Note that the 16:9 HD contents-signal Dhi1 supplied to, for example, the input port PIh1 of the HD switcher 15*d* is switched to the 16:9 SD contents-signal Dsi2 to be supplied to, for example, the input port PIs2 of the SD switcher 13*d* (see CASE 5 shown in FIG. 11).

In this CASE 5, since the 16:9 HD contents-signal has been delivered before the switching, the HD switcher 15*d* selects the 16:9 HD contents-signal Dhi1 supplied to the input port PIh1 to deliver it as the HD delivery signal Dhout. Since the 16:9 SD contents-signal is delivered after the switching, it is necessary that the HD switcher 15*d* selects the signal Dsu-htb supplied to the input port PIhb from the up-converter 14*tb* to deliver it as the HD delivery signal Dhout in order to prevent the image showing the contents from being displayed as to be reduced from the screen thereof. It is also necessary that the SD switcher 13*d* selects the 16:9 SD contents-signal Dsi2 supplied to the input port PIs2 after the switching and delivers it as the SD delivery signal Dsout. If a supply of the signal Dsu-htb from the up-converter 14*tb* is delayed from the switching timing based on the delivery control information, any switching shock may occur when the HD switcher 15*d* switches the signals at this switching timing.

Thus, before the switching timing based on the delivery control information, the controller 20*d* controls the SD contents supplier 11 to supply the 16:9 SD contents-signal Dsi2 to the input port PIs2 in the SD switcher 13*d* and controls the SD switcher 13*d* to supply the 16:9 SD contents-signal Dsi2 thus supplied to the input port PIs2 to the up-converter 14*tb* as a signal Dsub via the HD conversion output port POsb in the SD switcher 13*d*. The controller 20*d* then controls the HD switcher 15*d* to switch the contents-signals at the switching timing based on the delivery control information so that the HD delivery signal Dhout to be delivered from the delivery port POh can be switched from the 16:9 HD contents-signal Dhi1 supplied to the input port PIh1 to the signal Dsu-htb supplied to the input port PIhb. The controller 20*d* controls the SD switcher 13*d* to switch the contents-signals at the switching timing based on the delivery control information so that the SD delivery signal Dsout to be delivered from the delivery port POs can be switched from signal Dhd-slt supplied from the down-converter 16*lt* to the input port PIsb to the 16:9 SD contents-signal Dsi2 supplied to the input port PIs2.

Therefore, the contents to be simultaneously delivered are switched from the 16:9 HD contents-signal supplied to the input port PIh1 to the 16:9 SD contents-signal supplied to the input port PIs2 at the switching timing thereof. Since the signals are switched after the up-converter 14*tb* supplies the signal Dsu-htb to the input port PIhb in the HD switcher 15*d*, no switching shock occurs in the image based on the SD delivery signal Dsout and no image showing the contents is displayed as to be reduced from the screen thereof.

Note that the 16:9 HD contents-signal Dhi1 supplied to, for example, the input port PIh1 of the HD switcher 15*d* is switched to the 4:3 SD contents-signal Dsi4 to be supplied to, for example, the input port PIs4 of the SD switcher 13*d* (see CASE 6 shown in FIG. 11).

In this CASE 6, since the 16:9 HD contents-signal has been delivered before the switching, the HD switcher 15*d* selects 16:9 HD contents-signal Dhi1 supplied to the input port PIh1 to deliver it as the HD delivery signal Dhout. Since the 4:3 SD contents-signal is delivered after the witching, it is necessary that the HD switcher 15*d* selects the signal Dsu-hsp supplied from the up-converter 14*sp* to the input port PIha of the HD switcher 15*d* to deliver it as the HD delivery signal Dhout in order to prevent lack from occurring in the image showing the contents. It is also necessary that the SD switcher 13*d* selects the 4:3 SD contents-signal Dsi4 supplied to the input port PIs4 after the switching and delivers it as the SD delivery signal Dsout. If a supply of the signal Dsu-hsp from the up-converter 14*sp* is delayed from the switching timing based on the delivery control information, any switching shock may occur when the HD switcher 15*d* switches the signals at this switching timing.

Thus, before the switching timing based on the delivery control information, the controller 20*d* controls the SD contents supplier 11 to supply the 4:3 SD contents-signal Dsi4 to the input port PIs4 of the SD switcher 13*d* and controls the SD switcher 13*d* to supply this 4:3 SD contents-signal Dsi4 thus supplied to the input port PIs4 to the up-converter 14*sp* as a signal Dsua via the HD conversion output port POsa. The controller 20*d* then controls the HD switcher 15*d* to switch the contents-signals at the switching timing based on the delivery control information so that the HD delivery signal Dhout to be delivered from the delivery port POh can be switched from the 16:9 HD contents-signal Dhi1 supplied to the input port PIh1 to the signal Dsu-hsp supplied to the input port PIha. Further, the controller 20*d* controls the SD switcher 13*d* to switch the contents-signals at the switching timing based on the delivery control information so that the SD contents-signal Dsout to be delivered form the delivery port POs can be switched from the signal Dhd-slt supplied from the down-converter 16*lt* to the input port PIsb to the 4:3 D contents-signal Dsi4 supplied to the input port PIs4.

Therefore, the contents to be simultaneously delivered are switched from the 16:9 HD contents-signal supplied to the input port PIh1 to the 4:3 SD contents-signal supplied to the input port PIs4 at the switching timing thereof. Since the signals are switched after the up-converter 14*sp* supplies the signal Dsu-hsp to the input port PIha in the HD switcher 15*d*, no switching shock occurs in an image based on the HD delivery signal Dhout and no lack occurs in the image showing the contents.

Note that the 4:3 HD contents-signal Dhi3 supplied to, for example, the input port PIh3 of the HD switcher 15*d* is switched to the 16:9 SD contents-signal Dsi2 to be supplied to, for example, the input port PIs2 of the SD switcher 13*d* (see CASE 7 shown in FIG. 11).

In this CASE 7, since the 4:3 HD contents-signal has been delivered before the switching, the HD switcher 15*d* selects the 4:3 HD contents-signal Dhi3 supplied to the input port PIh3 to deliver it as the HD delivery signal Dhout. Since the 16:9 SD contents-signal is delivered after switching, it is necessary that the HD switcher 15*d* selects the signal Dsu-htb supplied from the up-converter 14*tb* to the input port PIhb thereof to deliver it as the HD delivery signal in order to prevent the image showing the contents from being displayed as to be reduced from the screen thereof. It is also necessary that the SD switcher 13*d* selects the 16:9 SD contents-signal Dsi2 supplied to the input port PIs2 after the switching and delivers it as the SD delivery signal Dsout. If a supply of the signal Dsu-htb from the up-converter 14*tb* is delayed from the switching timing based on the delivery control information, any switching shock may occur when the HD switcher 15*d* switches the signals at this switching timing.

Thus, before the switching timing based on the delivery control information, the controller 20*d* controls the SD contents supplier 11 to supply the 16:9 SD contents-signal Dsi2 from the SD contents supplier 11 to the input port PIs2 in the SD switcher 13*d* and controls the SD switcher 13*d* to supply the 16:9 SD contents-signal Dsi2 thus supplied to this input port PIs2 to the up-converter 14*tb* as the signal Dsub via the HD conversion output port POsb in the SD switcher 13*d*. The controller 20*d* then controls the HD switcher 15*d* to switch the contents-signals at the switching timing based on the delivery control information so that the HD delivery signal Dhout to be delivered from the delivery port POh can be switched from the 4:3 HD contents-signal Dhi3 supplied to the input port PIh3 to the signal Dsu-htb supplied to the input port PIhb of the HD switcher 15*d*. Further, the controller 20*d* controls the SD switcher 13*d* to switch the contents-signals at the switching timing based on the delivery control information so that the SD contents-signal Dsout to be delivered from the delivery port POs can be switched from the signal Dhd-ssc supplied from the down-converter 16*sc* to the input port PIsa to the 16:9 SD contents-signal Dsi2 supplied to the input port PIs2.

Therefore, the contents to be simultaneously delivered are switched from the 4:3 HD contents-signal supplied to the input port PIh3 to the 16:9 SD contents-signal supplied to the input port PIs2 at the switching timing thereof. Since the signals are switched after the up-converter 14*tb* supplies the signal Dsu-htb to the input port PIhb in the HD switcher 15*d*, no switching shock occurs in an image based on the HD delivery signal Dhout and no image showing the contents is displayed as to be reduced from the screen thereof.

Note that the 4:3 HD contents-signal Dhi3 supplied to, for example, the input port PIh3 of the HD switcher 15*d* is switched to the 4:3 SD contents-signal Dsi4 to be supplied to, for example, the input port PIs4 of the SD switcher 13*d* (see CASE 8 shown in FIG. 11).

In this CASE 8, since the 4:3 HD contents-signal has been delivered before the switching, the HD switcher 15*d* selects the 4:3 HD contents-signal Dhi3 supplied to the input port PIh3 to deliver it as the HD delivery signal Dhout. Since the 4:3 SD contents-signal is delivered after switching, it is necessary that the HD switcher 15*d* selects the signal Dsu-hsp supplied from the up-converter 14*sp* to the input port PIha thereof to deliver it as the HD delivery signal Dhout in order to prevent lack from occurring in the image showing the contents. It is also necessary that the SD switcher 13*d* selects the 4:3 SD contents-signal Dsi4 supplied to the input port PIs4 after the switching and delivers it as the SD delivery signal Dsout. If a supply of the signal Dsu-hsp from the up-converter 14*sp* is delayed from the switching timing based on the delivery control information, any switching shock may occur when the HD switcher 15*d* switches the signals at this switching timing.

Thus, before the switching timing based on the delivery control information, the controller 20*d* controls the SD contents supplier 11 to supply the 4:3 SD contents-signal Dsi4 from the SD contents supplier 11 to the input port PIs4 in the SD switcher 13*d* and controls the SD switcher 13*d* to supply the 4:3 SD contents-signal Dsi4 thus supplied to this input port PIs4 to the up-converter 14*sp* as the signal Dsua via the HD conversion output port POsa in the SD switcher 13*d*. The controller 20*d* then controls the HD switcher 15*d* to switch the contents-signals at the switching timing based on the delivery control information so that the HD delivery signal Dhout to be delivered from the delivery port POh can be switched from the 4:3 HD contents-signal Dhi3 supplied to the input port PIh3 to the signal Dsu-hsp supplied to the input port PIha of the HD switcher 15*d*. Further, the controller 20*d* controls the SD switcher 13*d* to switch the contents-signals at the switching timing based on the delivery control information so that the SD contents-signal Dsout to be delivered from the delivery port POs can be switched from the signal Dhd-ssc supplied from the down-converter 16*sc* to the input port PIsa of the SD switcher 13*d* to the 4:3 SD contents-signal Dsi4 supplied to the input port PIs4 of the SD switcher 13*d*.

Therefore, the contents to be simultaneously delivered are switched from the 4:3 HD contents-signal supplied to the input port PIh3 to the 4:3 SD contents-signal supplied to the input port PIs4 at the switching timing thereof. Since the signals are switched after the up-converter 14*sp* supplies the signal Dsu-hsp to the input port PIha in the HD switcher 15*d*, no switching shock occurs in an image based on the HD delivery signal Dhout and no lack occurs in the image showing the contents.

Note that the 16:9 SD contents-signal Dsi1 supplied to, for example, the input port PIs1 of the SD switcher 13*d* is switched to the 16:9 HD contents-signal Dhi2 to be supplied to, for example, the input port PIh2 of the HD switcher 15*d* (see CASE 9 shown in FIG. 11).

In this CASE 9, since the 16:9 SD contents-signal has been delivered before the switching, the SD switcher 13*d* selects the 16:9 SD contents-signal Dsi1 supplied to the input port PIs1 thereof to deliver it as the SD delivery signal Dsout. Since the 16:9 HD contents-signal is delivered after switching, it is necessary that the SD switcher 13*d* selects the signal Dhd-slt supplied from the down-converter 16*lt* to the input port PIsb thereof to deliver it as the SD delivery signal Dsout in order to prevent lack from occurring in the image showing the contents. It is also necessary that the HD switcher 15*d* selects the 16:9 HD contents-signal Dhi2 supplied to the input port PIh2 after the switching and delivers it as the HD delivery signal Dhout. If a supply of the signal Dhd-slt from the down-converter 16*lt* is delayed from the switching timing based on the delivery control information, any switching shock may occur when the SD switcher 13*d* switches the signals at this switching timing.

Thus, before the switching timing based on the delivery control information, the controller 20*d* controls the HD contents supplier 12 to supply the 16:9 HD contents-signal Dhi2 from the HD contents supplier 12 to the input port PIh2 in the HD switcher 15*d* and controls the HD switcher 15*d* to supply the 16:9 HD contents-signal Dhi2 thus supplied to this input port PIh2 to the down-converter 16*lt* as the signal Dhdb via the SD conversion output port POhb in the HD switcher 15*d*. The controller 20*d* then controls the SD switcher 13*d* to switch the contents-signals at the switching timing based on the delivery control information so that the SD delivery signal Dsout to be delivered from the delivery port POs can be switched from the 16:9 SD contents-signal Dsi1 supplied to the input port PIs1 to the signal Dhd-slt supplied to the input port PIsb of the SD switcher 13d. Further, the controller 20d controls the HD switcher 15d to switch the contents-signals at the switching timing based on the delivery control information so that the HD contents-signal Dhout to be delivered from the delivery port POh can be switched from the signal Dsu-htb supplied from the up-converter 14tb to the input port PIhb of the HD switcher 15d to the 16:9 HD contents-signal Dhi2 supplied to the input port PIh2 of the HD switcher 15d.

Therefore, the contents to be simultaneously delivered are switched from the 16:9 SD contents-signal supplied to the input port PIs1 to the 16:9 HD contents-signal supplied to the input port PIh2 at the switching timing thereof. Since the signals are switched after the down-converter 16lt supplies the signal Dhd-slt to the input port PIsb in the SD switcher 13d, no switching shock occurs in an image based on the SD delivery signal Dsout and no lack occurs in the image showing the contents.

Note that the 16:9 SD contents-signal Dsi1 supplied to, for example, the input port PIs1 of the SD switcher 13d is switched to the 4:3 HD contents-signal Dhi4 to be supplied to, for example, the input port PIh4 of the HD switcher 15d (see CASE 10 shown in FIG. 11).

In this CASE 10, since the 16:9 SD contents-signal has been delivered before the switching, the SD switcher 13d selects the 16:9 SD contents-signal Dsi1 supplied to the input port PIs1 thereof to deliver it as the SD delivery signal Dsout. Since the 4:3 HD contents-signal is delivered after the switching, it is necessary that the SD switcher 13d selects the signal Dhd-ssc supplied from the down-converter 16sc to the input port PIsa thereof to deliver it as the SD delivery signal Dsout in order to prevent the image showing the contents from being displayed as to be reduced from the screen thereof. It is also necessary that the HD switcher 15d selects the 4:3 contents-signal Dhi4 supplied to the input port PIh4 thereof after the switching and delivers it as the HD delivery signal Dhout. If a supply of the signal Dhd-ssc from the down-converter 16sc is delayed from the switching timing based on the delivery control information, any switching shock may occur when the SD switcher 13d switches the signals at this switching timing.

Thus, before the switching timing based on the delivery control information, the controller 20d controls the HD contents supplier 12 to supply the 4:3 HD contents-signal Dhi4 to the input port PIh4 of the HD switcher 15d and controls the HD switcher 15d to supply this 4:3 HD signal thus supplied to the input port PIh4 to the down-converter 16sc as signal Dhda via the SD conversion output port POha. The controller 20d then controls the SD switcher 13d to switch the contents-signals at the switching timing based on the delivery control information so that the SD delivery signal Dsout to be delivered from the delivery port POs can be switched from the 16:9 SD contents-signal Dsi1 supplied to the input port PIs1 to the signal Dhd-ssc supplied to the input port PIsa. Further, the controller 20d controls the HD switcher 15d to switch the contents-signals at the switching timing based on the delivery control information so that the HD contents-signal Dhout to be delivered form the delivery port POh can be switched from the signal Dsu-htb supplied from the up-converter 14tb to the input port PIhb to the 4:3 HD contents-signal Dhi4 supplied to the input port PIh4.

Therefore, the contents to be simultaneously delivered are switched from the 16:9 SD contents-signal supplied to the input port PIs1 to the 4:3 HD contents-signal supplied to the input port PIh4 at the switching timing thereof. Since the signals are switched after the down-converter 16sc supplies the signal Dhd-ssc to the input port PIsa in the SD switcher 13d, no switching shock occurs in an image based on the SD delivery signal Dsout and no image is displayed as to be reduced from the screen thereof.

Note that the 4:3 SD contents-signal Dsi3 supplied to, for example, the input port PIs3 of the SD switcher 13d is switched to the 16:9 HD contents-signal Dhi2 to be supplied to, for example, the input port PIh2 of the HD switcher 15d (see CASE 11 shown in FIG. 11).

In this CASE 11, since the 4:3 SD contents-signal has been delivered before the switching, the SD switcher 13d selects the 4:3 SD contents-signal Dsi3 supplied to the input port PIs3 thereof and delivers it as the SD delivery signal Dsout. Since the 16:9 HD contents-signal is delivered after the switching, it is necessary that the SD switcher 13d selects the signal Dhd-slt supplied from the down-converter 16lt to the input port PIsb thereof to deliver it as the SD delivery signal Dsout in order to prevent lack from occurring in the image showing the contents. It is also necessary that the HD switcher 15d selects the 16:9 HD contents-signal Dhi2 supplied to the input port PIh2 after the switching and delivers it as the HD delivery signal Dhout. If a supply of the signal Dhd-slt from the down-converter 16lt is delayed from the switching timing based on the delivery control information, any switching shock may occur when the SD switcher 13d switches the signals at this switching timing.

Thus, before the switching timing based on the delivery control information, the controller 20d controls the HD contents supplier 12 to supply the 16:9 HD contents-signal Dhi2 from the HD contents supplier 12 to the input port PIh2 in the HD switcher 15d and controls the HD switcher 15d to supply the 16:9 HD contents-signal Dhi2 thus supplied to this input port PIh2 to the down-converter 16lt as the signal Dhdb via the SD conversion output port POhb in the HD switcher 15d. The controller 20d then controls the SD switcher 13d to switch the contents-signals at the switching timing based on the delivery control information so that the SD delivery signal Dsout to be delivered from the delivery port POs can be switched from the 4:3 SD contents-signal Dsi3 supplied to the input port PIs3 to the signal Dhd-slt supplied to the input port PIsb. Further, the controller 20d controls the HD switcher 15d to switch the contents-signals at the switching timing based on the delivery control information so that the HD contents-signal Dhout to be delivered from the delivery port POh can be switched from the signal Dsu-hsp supplied from the up-converter 14sp to the input port PIha to the 16:9 HD contents-signal Dhi2 supplied to the input port PIh2.

Therefore, the contents to be simultaneously delivered are switched from the 4:3 SD contents-signal supplied to the input port PIh3 to the 16:9 HD contents-signal supplied to the input port PIh2 at the switching timing thereof. Since the signals are switched after the down-converter 16lt supplies the signal Dhd-slt to the input port PIsb in the SD switcher 13d, no switching shock occurs in an image based on the SD delivery signal Dsout and no lack occurs in the image showing the contents.

Note that the 4:3 SD contents-signal Dsi3 supplied to, for example, the input port PIs3 of the SD switcher 13d is switched to the 4:3 HD contents-signal Dhi4 to be supplied to, for example, the input port PIh4 of the HD switcher 15d (see CASE 12 shown in FIG. 11).

In this CASE 12, since the 4:3 SD contents-signal has been delivered before the switching, the SD switcher 13d selects the 4:3 SD contents-signal Dsi3 supplied to the input port PIs3 to deliver it as the SD delivery signal Dsout. Since the 4:3 HD contents-signal is delivered after the switching, it is necessary that the SD switcher 13d selects the signal Dhd-ssc supplied from the down-converter 16sc to the input port PIsa to deliver it as SD delivery signal Dsout in order to prevent the image showing the contents from being displayed as to be reduced from the screen thereof. It is also necessary that the HD switcher 15d selects the 4:3 contents-signal Dhi4 supplied to the input port PIh4 after the switching and delivers it as HD delivery signal Dhout. If a supply of the signal Dhd-ssc from the down-converter 16sc is delayed from the switching timing based on the delivery control information, any switching shock may occur when the SD switcher 13d switches the signals at this switching timing.

Thus, before the switching timing based on the delivery control information, the controller 20d controls the HD contents supplier 12 to supply the 4:3 contents-signal Dhi4 to the input port PIh4 of the HD switcher 15d and controls the HD switcher 15d to supply the 4:3 HD contents-signal Dhi4 thus supplied to the input port PIh4 to the down-converter 16sc as the signal Dhda via the SD conversion output port POha. The controller 20d then controls the SD switcher 13d to switch the contents-signals at the switching timing based on the delivery control information so that the SD delivery signal Dsout to be delivered from the delivery port POs can be switched from the 4:3 SD contents-signal Dsi3 supplied to the input port PIs3 to the signal Dhd-hsp supplied to the input port PIsa. Further, the controller 20d controls the HD switcher 15d to switch the contents-signals at the switching timing based on the delivery control information so that the HD contents-signal Dhout to be delivered from the delivery port POh can be switched from the signal Dsu-hsp supplied from the up-converter 14sp to the input port PIha to the 4:3 HD contents-signal Dhi4 supplied to the input port PIh4.

Therefore, the contents to be simultaneously delivered are switched from the 4:3 SD contents-signal supplied to the input port PIs3 to the 4:3 HD contents-signal supplied to the input port PIh4 at the switching timing thereof. Since the signals are switched after the down-converter 16sc supplies the signal Dhd-ssc to the input port PIsa of the SD switcher 13d, no switching shock occurs in the image based on the SD delivery signal Dsout and no image showing the contents is displayed as to be reduced from the screen thereof.

Note that the 16:9 SD contents-signal Dsi1 supplied to, for example, the input port PIs1 of the SD switcher 13d is switched to the 16:9 SD contents-signal Dsi2 to be supplied to the input port PIs2 of the SD switcher 13d (see CASE 13 shown in FIG. 11).

In this CASE 13, since the 16:9 SD contents-signal has been delivered before the switching, the HD switcher 15d selects the signal Dsu-htb supplied from the up-converter 14tb to the input port PIhb to deliver it as the HD delivery signal Dhout in order to prevent the image showing the contents from being displayed as to be reduced from the screen thereof. Since the 16:9 SD contents-signal is delivered after the switching, it is unnecessary to switch the signals in the HD switcher 15d.

Thus, the controller 20d controls the SD switcher 13d to switch the contents-signals at the switching timing based on the delivery control information so that the SD delivery signal Dsout to be delivered from the delivery port POs can be switched from the 16:9 SD contents-signal Dsi1 supplied to the input port PIs1 to the 16:9 SD contents-signal Dsi2 supplied to the input port PIs2. The controller 20d also controls the SD switcher 13d to switch the contents-signals at the switching timing based on the delivery control information so that the signal Dsub to be output from the HD conversion output port POsb can be switched from the 16:9 SD contents-signal Dsi1 supplied to the input port PIs1 to the 16:9 SD contents-signal Dsi2 supplied to the input port PIs2.

Therefore, the contents to be simultaneously delivered are switched from the 16:9 SD contents-signal supplied to the input port PIs1 to the 16:9 SD contents-signal supplied to the input port PIs2 at the switching timing thereof. Since no signal is switched in the HD switcher 15d, no switching shock occurs in the image based on the HD delivery signal Dhout.

Note that the 16:9 SD contents-signal Ds1 supplied to, for example, the input port PIs1 of the SD switcher 13d is switched to the 4:3 SD contents-signal Dsi4 to be supplied to an input port PIs4 of the SD switcher 13d (see CASE 14 shown in FIG. 11).

In this CASE 14, since the 16:9 SD contents-signal has been delivered before the switching, the HD switcher 15d selects the signal Dsu-htb supplied from the up-converter 14tb to the input port PIhb to deliver it as the HD delivery signal Dhout in order to prevent the image showing the contents from being displayed as to be reduced from the screen thereof. It is necessary to select the 4:3 SD contents-signal Dsi4 having a different aspect ratio after the switching. Thus, it is also necessary that the HD switcher 13d selects the signal Dsu-hsp supplied from the up-converter 14sp to the input port PIha instead of the signal Dsu-htb supplied from the up-converter 14tb to the input port PIhb and delivers it as the HD delivery signal Dhout in order to prevent lack from occurring in the image showing the contents. If a supply of the signal Dsu-hsp from the up-converter 14sp is delayed from the switching timing based on the delivery control information, any switching shock may occur when the HD switcher 15d switches the signals at this switching timing.

Thus, before the switching timing based on the delivery control information, the controller 20d controls the SD contents supplier 11 to supply the 4:3 SD contents-signal Dsi4 to the input port PIs4 of the SD switcher 13d and controls the SD switcher 13d to supply this 4:3 SD contents-signal thus supplied to the input port PIs4 to the up-converter 14sp as a signal Dsua via the HD conversion output port POsa. The controller 20d then controls the SD switcher 13d to switch the contents-signals at the switching timing based on the delivery control information so that the SD delivery signal Dsout to be delivered from the delivery port POs can be switched from the 16:9 SD contents-signal Dsi1 supplied to the input port PIs1 to the 4:3 SD contents-signal Dsi4 supplied to the input port PIs4. Further, the controller 20d controls the HD switcher 15d to switch the contents-signals at the switching timing based on the delivery control information so that the HD delivery signal Dhout to be delivered form the delivery port POh can be switched from the signal Dsu-htb supplied from the up-converter 14tb to the input port PIhb to the signal Dsu-hsp supplied from the up-converter 14tb to the input port PIha.

Therefore, the contents to be simultaneously delivered are switched from the 16:9 SD contents-signal supplied to the input port PIs1 to the 4:3 SD contents-signal supplied to the input port PIs4 at the switching timing thereof. Since the signals are switched after the up-converter 14sp supplies the signal Dsu-hsp to the input port PIha in the HD switcher 15d, no switching shock occurs in an image based on the HD delivery signal Dhout and no lack occurs in the image showing the contents.

Note that the 4:3 SD contents-signal Dsi3 supplied to, for example, the input port PIs3 of the SD switcher 13d is switched to the 16:9 SD contents-signal Dsi2 to be supplied to the input port PIs2 of the SD switcher 13d (see CASE 15 shown in FIG. 11).

In this CASE 15, since the 4:3 SD contents-signal has been delivered before the switching, the HD switcher 15d selects the signal Dsu-hsp supplied from the up-converter 14sp to the input port PIha to deliver it as the HD delivery signal Dhout in order to prevent lack from occurring in the image showing the contents. It is necessary to select the 16:9 SD contents-signal having a different aspect ratio after the switching. Thus, it is necessary that the HD switcher 15*d* selects the signal Dsu-htb supplied from the up-converter 14*tb* to the input port PIhb thereof instead of the signal Dsu-hsp supplied from the up-converter 14*sp* to the input port PIha and delivers it as the HD delivery signal in order to prevent the image showing the contents from being displayed as to be reduced from the screen thereof. If a supply of the signal Dsu-htb from the up-converter 14*tb* is delayed from the switching timing based on the delivery control information, any switching shock may occur when the HD switcher 15*d* switches the signals at this switching timing.

Thus, before the switching timing based on the delivery control information, the controller 20*d* controls the SD contents supplier 11 to supply the 16:9 SD contents-signal Dsi2 from the SD contents supplier 11 to the input port PIs2 in the SD switcher 13*d* and controls the SD switcher 13*d* to supply the 16:9 SD contents-signal Dsi2 thus supplied to this input port PIs2 to the up-converter 14*tb* as the signal Dsub via the HD conversion output port POsb in the SD switcher 13*d*. The controller 20*d* then controls the SD switcher 13*d* to switch the contents-signals at the switching timing based on the delivery control information so that the SD delivery signal Dsout to be delivered from the delivery port POs can be switched from the 4:3 SD contents-signal Dsi3 supplied to the input port PIs3 to the 16:9 SD contents-signal Dsi2 supplied to the input port PIs2 of the SD switcher 13*d*. Further, the controller 20*d* controls the HD switcher 15*d* to switch the contents-signals at the switching timing based on the delivery control information so that the HD contents-signal Dhout to be delivered from the delivery port POh can be switched from the signal Dsu-hsp supplied from the up-converter 14*sp* to the input port PIha to the signal Dsu-htb supplied from the up-converter 14*tb* to the input port PIhb.

Therefore, the contents to be simultaneously delivered are switched from the 4:3 SD contents-signal supplied to the input port PIs3 to the 16:9 SD contents-signal supplied to the input port PIs2 at the switching timing thereof. Since the signals are switched after the up-converter 14*tb* supplies the signal Dsu-htb to the input port PIhb in the HD switcher 15*d*, no switching shock occurs in an image based on the HD delivery signal Dhout and no image showing the contents is displayed as to be reduced from screen thereof.

Note that the 4:3 SD contents-signal Dsi3 supplied to, for example, the input port PIs3 of the SD switcher 13*d* is switched to the 4:3 SD contents-signal Dsi4 to be supplied to the input port PIs4 of the SD switcher 13*d* (see CASE 16 shown in FIG. 11).

In this CASE 16, since the 4:3 SD contents-signal has been delivered before the switching, the HD switcher 15*d* selects the signal Dsu-hsp supplied from the up-converter 14*sp* to the input port PIha to deliver it as the HD delivery signal Dhout in order to prevent a lack from occurring in the image showing the contents. Since the 4:3 SD contents-signal is delivered after switching, it is unnecessary to switch the signals in the HD switcher 15*d*.

Thus, the controller 20*d* controls the SD switcher 13*d* to switch the contents-signals at the switching timing based on the delivery control information so that the SD delivery signal Dsout to be delivered from the delivery port POs can be switched from the 4:3 SD contents-signal Dsi3 supplied to the input port PIs3 in the SD switcher 13*d* to the 4:3 SD contents-signal Dsi4 supplied to the input port PIs4. The controller 20*d* also controls the SD switcher 13*d* to switch the signal Dsua to be output from the HD conversion output port POsa at the switching timing based on the delivery control information from the 4:3 SD contents-signal Dsi3 supplied to the input port PIs3 to the 4:3 SD contents-signal Dsi4 supplied to the input port PIs4.

Therefore, the contents to be simultaneously delivered are switched from the 4:3 SD contents-signal supplied to the input port PIs3 to the 4:3 SD contents-signal supplied to the input port PIs4 at the switching timing thereof. Since no signal is switched in the HD switcher 15*d*, no switching shock occurs in an image based on the HD delivery signal Dhout.

Thus, when delivering the signal that is converted in its aspect ratio according to a aspect ratio of the image showing the contents, the embodiments of the system for delivering the contents automatically can deliver a contents-signal without any switching shock occurs. The image showing the contents that such the system delivers is not displayed as to be reduced from the screen thereof.

The above embodiments of the system for delivering the contents automatically can be used for a digital or an analog signal. For example, if the SD switcher 13 and the HD switcher 15 switch the digital signals and the SD contents supplier 11 supplies analog SD contents-signal, the analog SD contents-signal can be easily delivered as described above when a switcher for selecting the SD contents-signal to be delivered and an A/D converter for converting a signal selected by the switcher to a digital signal and to supply it to the SD switcher 13 are provided between the SD contents supplier 11 and the SD switcher 13. If the SD delivery signal is delivered as an analog signal, a D/A converter may be provided for converting the SD delivery signal Dsout to the analog signal.

The above embodiments have been described on a case where the contents having the same contents are simultaneously delivered with the SD format and the HD format using the contents-signals having SD format and HD format, the invention is not limited to the above embodiments. Such the contents to be delivered refer to not only two different formats but also three or more formats. If three or more formats are used, the same contents can be simultaneously delivered with any different formats when any means for selecting signal and/or for converting the signal is provided according to the format to be used. Of course, it is possible to deliver the contents simultaneously through plural channels.

It should be understood that the invention is not limited to the above embodiments and that the invention can be applied equally well to other types of the system for delivering the contents with different formats, which relate to broadcast programs and delivery programs, automatically, according to the schedule thereof.

While the foregoing specification has described preferred embodiment(s) of the present invention, one skilled in the art may make various modifications, combinations, sub-combinations and alteration to the preferred embodiment(s) depending on design requirements and other factors insofar as they are within the scope of the appended claims or the equivalents thereof.

What is claimed is:

1. A system for delivering contents automatically, said system comprising:
    first signal-selecting-and-delivering means for selecting a contents-signal from the contents-signals each having a first format of the contents-signal and delivering the selected contents-signal having the first format;
    second signal-selecting-and-delivering means for selecting a contents-signal from the contents-signals each having a second format of the contents-signal and delivering the selected contents-signal having the second format;

signal-supplying means for supplying the contents-signals each having the first format to the first signal-selecting-and-delivering means and the contents-signals each having the second format to the second signal-selecting-and delivering means;

signal-converting means for converting the contents-signal that is output from the first signal-selecting-and-delivering means, said contents-signal having the first format, into the contents-signal having the second format and supplying the converted contents-signal having the second format to the second signal-selecting-and-delivering means; and control means for controlling signal-supplying operation of the signal-supplying means and signal-selecting-and-delivering operations of the first and second signal-selecting-and-delivering means to allow the first signal-selecting-and-delivering means to deliver the contents-signal having the first format and the second signal-selecting-and-delivering means to deliver the contents-signal having the second format, based on a predetermined delivery schedule of the contents.

2. The system for delivering contents automatically according to claim 1, wherein when the first signal-selecting-and-delivering means selects and delivers the contents-signal having the first format, the control means controls the first signal-selecting-and-delivering means to send the contents-signal having the first format to the signal-converting means, said signal-converting means converting the contents-signal having the first format into the contents-signal having the second format, said first format being different from the second format, and controls the second signal-selecting-and-delivering means to select and deliver the contents-signal having the second format.

3. The system for delivering contents automatically according to claim 2, wherein the signal-converting means converts aspect ratios of the contents-signals.

4. The system for delivering contents automatically according to claim 3, wherein when the first signal-selecting-and-delivering means selects and delivers the contents-signal having the first format, the control means controls the first signal-selecting-and-delivering means to send the contents-signal having the first format to the signal-converting means, said signal-converting means converting aspect ratio of the contents-signal having the first format into aspect ratio of the contents-signal having the second format on the basis of aspect ratio of image showing the contents of the contents-signal to be delivered, and controls the second signal-selecting-and-delivering means to select and deliver the contents-signal having the second format.

5. The system for delivering contents automatically according to claim 2, wherein when switching the contents to be delivered if the second signal-selecting-and-delivering means newly selects and delivers the contents-signal having the second format converted by the signal-converting means, the control means controls the signal-supplying means to supply the contents-signal having the first format to the first signal-selecting-and-delivering means and controls the first signal-selecting-and-delivering means to send the contents-signal having the first format to the signal-converting means before switching the contents, thereby allowing the signal, to be selected and delivered after the switching thereof, having the second format to be supplied to the second signal-selecting-and-delivering means at a switching time thereof.

6. A system for delivering contents automatically, said system comprising:

first signal-selecting-and-delivering device that selects a contents-signal from the contents-signals each having a first format of the contents-signal and delivers the selected contents-signal having the first format;

second signal-selecting-and-delivering device that selects a contents-signal from the contents-signals each having a second format of the contents-signal and delivers the selected contents-signal having the second format;

signal-supplying device that supplies the contents-signals each having the first format to the first signal-selecting-and-delivering device and the contents-signals each having the second format to the second signal-selecting-and delivering device;

signal-converting device that converts the contents-signal output from the first signal-selecting-and-delivering device, said contents-signal having the first format, into the contents-signal having the second format and supplies the converted contents-signal having the second format to the second signal-selecting-and-delivering device; and control device that controls signal-supplying operation of the signal-supplying device and signal-selecting-and-delivering operations of the first and second signal-selecting-and-delivering devices to allow the first signal-selecting-and-delivering device to deliver the contents-signal having the first format and the second signal-selecting-and-delivering device to deliver the contents-signal having the second format, based on a predetermined delivery schedule of the contents.

7. The system for delivering contents automatically according to claim 6, wherein the signal-supplying device includes a first signal supplier for supplying the contents-signal having the first format to the first signal-selecting-and delivering device and a second signal supplier for supplying the contents-signal having the second format to the second signal-selecting-and-delivering device.

8. The system for delivering contents automatically according to claim 6, wherein the signal-converting device includes a first signal converter for converting the contents-signal having the first format into the contents-signal having the second format and a second signal converter for converting the contents-signal having the second format into the contents-signal having the first format.

* * * * *